(12) United States Patent
Panandiker et al.

(10) Patent No.: US 9,719,050 B2
(45) Date of Patent: Aug. 1, 2017

(54) ANTI-FOAM COMPOSITIONS COMPRISING AN ORGANOMODIFIED SILICONE COMPRISING ONE OR MORE 2-PHENYLPROPYLMETHYL MOIETIES

(71) Applicant: The Procter & Gamble Company, Cincinnati, OH (US)

(72) Inventors: Rajan Keshav Panandiker, West Chester, OH (US); Bernard William Kluesener, Harrison, OH (US); Rebecca Ann Langevin, Norwood, OH (US); Sherri Lynn Randall, Hamilton, OH (US); Takato Sakurai, Gunma-Ken (JP); Hiroyuki Moriya, Gunma-Ken (JP); Akihiro Kobayashi, Gunma-Ken (JP)

(73) Assignee: The Procter & Gamble Company, Cincinnati, OH (US)

( * ) Notice: Subject to any disclaimer, the term of this patent is extended or adjusted under 35 U.S.C. 154(b) by 202 days.

(21) Appl. No.: 14/631,908

(22) Filed: Feb. 26, 2015

(65) Prior Publication Data
US 2015/0240189 A1 Aug. 27, 2015

Related U.S. Application Data

(60) Provisional application No. 61/944,770, filed on Feb. 26, 2014, provisional application No. 61/991,649, filed on May 12, 2014, provisional application No. 62/028,965, filed on Jul. 25, 2014, provisional application No. 62/044,447, filed on Sep. 2, 2014.

(51) Int. Cl.
| | |
|---|---|
| *C11D 3/386* | (2006.01) |
| *C11D 3/50* | (2006.01) |
| *C11D 9/36* | (2006.01) |
| *C11D 3/00* | (2006.01) |
| *C11D 3/16* | (2006.01) |
| *C11D 3/12* | (2006.01) |
| *C08L 83/04* | (2006.01) |
| *C11D 3/37* | (2006.01) |
| *B01D 19/04* | (2006.01) |

(52) U.S. Cl.
CPC ........ *C11D 3/0026* (2013.01); *B01D 19/0409* (2013.01); *B01D 19/0431* (2013.01); *B01D 19/0436* (2013.01); *C08L 83/04* (2013.01); *C11D 3/124* (2013.01); *C11D 3/162* (2013.01); *C11D 3/373* (2013.01); *C11D 3/3723* (2013.01)

(58) Field of Classification Search
CPC ....... C11D 3/0026; C11D 3/001; C11D 3/124; C11D 3/162; C11D 3/373; C11D 3/3734; C11D 3/386; C11D 3/50; C11D 9/36; C11D 11/0017
See application file for complete search history.

(56) References Cited

U.S. PATENT DOCUMENTS

| | | |
|---|---|---|
| 2,220,099 A | 11/1940 | Guenther et al. |
| 2,477,383 A | 7/1949 | Lewis |
| 4,760,025 A | 7/1988 | Estell et al. |
| 5,352,604 A | 10/1994 | Wilson et al. |
| 5,679,630 A | 10/1997 | Baeck et al. |
| 6,093,562 A | 7/2000 | Bisgard-Frantzen et al. |
| 6,312,936 B1 | 11/2001 | Poulose et al. |
| 7,141,403 B2 | 11/2006 | Outtrup et al. |
| 7,262,042 B2 | 8/2007 | Weber et al. |
| 2008/0021152 A1 | 1/2008 | Rautschek et al. |
| 2013/0326823 A1* | 12/2013 | Somerville Roberts ......... C11D 3/162 8/137 |
| 2014/0289969 A1* | 10/2014 | Sadlowski ............ C11D 1/29 8/137 |
| 2014/0352076 A1* | 12/2014 | Song .................. C11D 3/0026 8/137 |
| 2015/0057212 A1* | 2/2015 | Hulskotter ............ C11D 3/30 510/320 |
| 2015/0240187 A1* | 8/2015 | Scheibel ................ C07C 29/16 510/498 |

FOREIGN PATENT DOCUMENTS

| | | |
|---|---|---|
| EP | 0 187 266 A2 | 7/1986 |
| EP | 1 075 864 A2 | 2/2001 |
| WO | WO 96/23874 A1 | 8/1996 |
| WO | WO 00/60060 A2 | 10/2000 |
| WO | WO 2006/002643 A2 | 1/2006 |
| WO | WO 2009/021867 A2 | 2/2009 |
| WO | WO 2009/043709 A1 | 4/2009 |
| WO | WO 2009/149130 A2 | 12/2009 |

OTHER PUBLICATIONS

Brooke, D. N., et al.; Octanol: Water Partition Coefficients (P): Measurement, Estimation, and Interpretation, Particularly for Chemicals with P > $10^5$; Ecotoxicology and Environmental Safety (1986); vol. 11; No. 3; pp. 251-260.

Adam, W., et al.; Thianthrene 5-Oxide as a Mechanistic Probe for Assessing the Electronic Character of Oxygen-Transfer Agents; Journal of the American Chemical Society (1991); vol. 113; No. 16; pp. 6202-6208.

International Search Report; International Application No. PCT/US2015/017629; date of mailing Jun. 10, 2015; 12 pages.

\* cited by examiner

*Primary Examiner* — Charles Boyer
(74) *Attorney, Agent, or Firm* — James F. McBride; Steven W. Miller

(57) ABSTRACT

The present application relates to anti-foam compositions and methods of making and using such compositions as well as consumer products that comprise such compositions and the use of same. Such anti-foam compositions have low viscosities yet are effective antifoamers.

20 Claims, No Drawings

ANTI-FOAM COMPOSITIONS COMPRISING AN ORGANOMODIFIED SILICONE COMPRISING ONE OR MORE 2-PHENYLPROPYLMETHYL MOIETIES

FIELD OF THE INVENTION

The present application relates to anti-foam compositions and methods of making and using such compositions as well as consumer products that comprise such compositions and the use of same.

BACKGROUND OF THE INVENTION

Cleaning and/or treatment compositions may employ materials that produce suds. In certain cleaning and/or treatment compositions, the level of suds is higher than desired. One manner of reducing suds is to add an anti-foamer to the cleaning and/or treatment composition. Unfortunately, while antifoam compositions that comprise high viscosity silicones are highly effective, such compositions must be emulsified before they are incorporated into a consumer product such as a cleaning and/or treatment composition. In order to avoid the emulsification step, low viscosity silicones have been employed in anti-foam compositions. Unfortunately such antifoam compositions are not very effective antifoams. As a result, dilutants have been used in combination with the high viscosity silicones. Such dilutants dramatically increase the viscosity of the subject antifoams, reduce the viscosity and the effectiveness of the antifoams, or have other negative interactions with the anti-foam's components.

Applicants recognized that the problems associated with using such dilutants, arises either from the dilutant's insolubility in the silicone component or if the dilutant is soluble in such silicone component the drop in viscosity which results in a decrease in the antifoam's effectiveness. Thus Applicants recognized that what is needed is an antifoam composition that comprises a dilutant that lowers the viscosity of the neat anti-foam and when the antifoam is mixed with a consumer product migrates from the antifoam into the consumer product. In short, the antifoam compositions disclosed herein have low viscosities yet provide the desired antifoaming efficacy.

SUMMARY OF THE INVENTION

The present application relates to anti-foam compositions and methods of making and using such compositions as well as consumer products that comprise such compositions and the use of same. Such anti-foam compositions have low viscosities yet are effective antifoamers.

DETAILED DESCRIPTION OF THE INVENTION

Definitions

As used herein "consumer product" means baby care, beauty care, fabric & home care, family care, feminine care, health care, snack and/or beverage products or devices intended to be used or consumed in the form in which it is sold, and not intended for subsequent commercial manufacture or modification. Such products include but are not limited to diapers, bibs, wipes; products for and/or methods relating to treating hair (human, dog, and/or cat), including, bleaching, coloring, dyeing, conditioning, shampooing, styling; deodorants and antiperspirants; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; products and/or methods relating to oral care including toothpastes, tooth gels, tooth rinses, denture adhesives, tooth whitening; over-the-counter health care including pain relievers, pet health and nutrition, and water purification.

As used herein, the term "cleaning and/or treatment composition" includes, unless otherwise indicated, unit dose, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

As used herein, the term "fabric care composition" includes, unless otherwise indicated, fabric softening compositions, fabric enhancing compositions, fabric freshening compositions and combinations thereof.

As used herein, the articles "a" and "an" when used in a claim, are understood to mean one or more of what is claimed or described.

As used herein, the terms "include", "includes" and "including" are meant to be synonymous with the phrase "including but not limited to".

As used herein, the term "solid" means granular, powder, bar and tablet product forms.

As used herein, the term "situs" includes paper products, fabrics, garments, hard surfaces, hair and skin.

As used to describe and/or recite the organomodified silicone element of the antifoams and consumer products comprising same herein, a 2-phenylpropylmethyl moiety is synonymous with: (methyl)(2-phenylpropyl); (2-Phenylpropyl)methyl; methyl(2-phenylpropyl); methyl(β-methylphenethyl); 2-phenylpropylmethyl; 2-phenylpropylMethyl; methyl 2-phenylpropyl; and Me 2-phenylpropyl. Thus, organomodified silicones can, by way of example, use such nomenclature as follows:
(methyl) (2-phenylpropyl)siloxane
(methyl)(2-phenylpropyl)siloxane
(2-Phenylpropyl)methylsiloxane
(2-Phenylpropyl)methyl siloxane
methyl(2-phenylpropyl)siloxane
methyl(2-phenylpropyl)siloxane
methyl(β-methylphenethyl)siloxane
methyl(β-methylphenethyl)siloxane
2-phenylpropylmethylsiloxane 2-phenylpropylmethyl siloxane
2-phenylpropylMethylsiloxane
2-phenylpropylMethyl siloxane
methyl 2-phenylpropylsiloxane
methyl 2-phenylpropyl siloxane
Me 2-phenylpropylsiloxane
Me 2-phenylpropyl siloxane.

As used herein, the term heteroatom takes it ordinary, customary meaning and thus includes N, O, S, P, Cl, Br, and I.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Anti-Foam Compositions and Compositions Comprising Same

An antifoam composition comprising:
a) an organomodified silicone comprising one or more 2-phenylpropylmethyl moieties, preferably 1 to 75 mole percent 2-phenylpropylmethyl moieties, more preferably 5 to 50 mole percent 2-phenylpropylmethyl moieties, more preferably 5 to 40 mole percent 2-phenylpropylmethyl moieties, more preferably 15 to 35 mole percent 2-phenylpropylmethyl moieties; most preferably, said organomodified silicone comprises 27 to 33 mole percent 2-phenylpropylmethyl moieties;
b) silica;
c) a siloxane polymer, said siloxane polymer having a solubility index of greater than about 0.8, more preferably greater than 0.85, more preferably greater than 0.9, more preferably greater than 0.95, greater than 0.98, most preferably from about 0.8 to 1.25 and having a viscosity of from about 0.5 cSt to about 10,000 cSt, of from about 0.5 cSt to about 5,000 cSt, of from about 0.5 cSt to about 1,000 cSt, of from about 2 cSt to about 1,000 cSt, preferably of from about 1 cSt to about 750 cSt, more preferably of from about 1 cSt to about 500 cSt, more preferably of from about 1 cSt to about 100 cSt, most preferably of from about 1 cSt to about 20 cSt; said siloxane polymer having a viscosity that is about 5%, more preferably about 10%, more preferably about 20%, more preferably about 40%, more preferably about 50%, more preferably about 60%, more preferably about 75%, more preferably about 90%, most preferably about 99%, less than that of said organomodified silicone; and
d) a silicone resin;
said antifoam composition having a viscosity, at a shear rate of 20 sec$^{-1}$ at 25° C., of from about 250 cSt to about 20,000 cSt, preferably of from about 500 cSt to about 10,000 cSt, more preferably of from about 1,000 cSt to about 7,000 cSt, most preferably of from about 1,000 cSt to about 4,000 cSt; a ratio of organomodified silicone to silica of from about 2:1 to about 500:1, preferably of from about 3:1 to about 100:1, more preferably of from about 4:1 to about 70:1, most preferably of from about 5:1 to about 50:1.

In one aspect of said antifoam composition, said siloxane polymer comprises a polydimethyl siloxane polymer having a viscosity of from about 0.5 cSt to about 1,000 cSt, preferably of from about 1 cSt to about 750 cSt, more preferably of from about 1 cSt to about 500 cSt, more preferably of from about 1 cSt to about 100 cSt, most preferably of from about 1 cSt to about 20 cSt.

In one aspect of said antifoam composition, said antifoam composition has a ratio of siloxane polymer to organomodified silicone of from 1:4 to 4:1, preferably from 1:3.8 to 3:2, more preferably from 1:3.6 to 2:3 or most preferably from 1:3 to 2:3, in one aspect, said ratio of siloxane polymer to organomodified silicone of from 1:5 to 1:3.

In one aspect of said antifoam composition, said organomodified silicone comprises units of the following formula (I):

$$R_a(R^1O)_bR^2_cSiO_{(4-a-b-c)/2} \qquad \text{Formula (I)}$$

wherein:
a) each R is independently selected from: H, an aromatic hydrocarbon radical covalently attached to silicon via aliphatic groups, or a monovalent, SiC-bonded, optionally substituted, aliphatic hydrocarbon radical that optionally comprises a heteroatom;
b) each $R^1$ is independently selected from: H, or a monovalent, optionally substituted aliphatic hydrocarbon radical, that optionally comprises a heteroatom;
c) each $R^2$ is independently selected from the group consisting of H, an aromatic hydrocarbon radical covalently attached to silicon via aliphatic groups, a monovalent, optionally substituted, aromatic hydrocarbon radical which is attached to the silicon atom via a carbon ring atom and a monovalent, SiC-bonded, optionally substituted, aliphatic hydrocarbon radical that optionally comprises a heteroatom;
d) the index a is 0, 1, 2 or 3;
e) the index b is 0, 1, 2 or 3;
f) the index c is 0, 1, 2 or 3;
with the proviso that the sum of a+b+c is an integer from 0 to 3.

In one aspect of said antifoam composition, said silica comprises hydrophobic, precipitated silica and/or hydrophobic, fumed silica.

In one aspect of said antifoam composition, said siloxane polymer has a viscosity of less than 20 cSt, preferably of from about 0.5 cSt to about 19 cSt, more preferably of from about 1 cSt to about 15 cSt, most preferably of from about 1.5 cSt to about 12 cSt, preferably, said siloxane polymer comprises polydimethylsiloxane.

In one aspect of said antifoam composition, said silicone resin comprises units of formula (II) below:

$$R^3_d(R^4O)_eSiO_{(4-d-e)/2} \qquad \text{Formula (II)}$$

wherein:
a) each $R^3$ is independently selected from H, a monovalent, SiC-bonded, optionally substituted, aliphatic hydrocarbon radical that optionally comprises a heteroatom, or an aromatic hydrocarbon radical covalently attached to silicon via aliphatic groups;

b) each $R^4$ is independently selected from H, or a monovalent, optionally substituted aliphatic hydrocarbon radical, that optionally comprises a heteroatom;
c) the index d is 0, 1, 2 or 3; and
d) the index e is 0, 1, 2 or 3
with the proviso that the sum of d+e is an integer from 0 to 3.

In one aspect of said antifoam composition, said antifoam composition comprises, based upon total antifoam composition weight:
a) 50-75% organomodified silicone;
b) 1.5-4.0% silicone resin;
c) 15-40% of siloxane polymer;
d) 4-8% silica; and
e) 0-4% solvent.

In one aspect, said solvent may be selected from the group consisting of lipophilic fluids, including siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, alkyl esters, and mixtures thereof. Low molecular weight primary or secondary alcohols exemplified by methanol, ethanol, propanol, and isopropanol are suitable. Monohydric alcohols may be used in some examples for solubilizing surfactants, and polyols such as those containing from 2 to about 6 carbon atoms and from 2 to about 6 hydroxy groups (e.g., 1,3-propanediol, ethylene glycol, glycerine, and 1,2-propanediol) may also be used. Amine-containing solvents, such as monoethanolamine, diethanolamine and triethanolamine, may also be used.

In one aspect of said antifoam composition, the ratio of organomodified silicone to silica is from about 8:1 to about 15:1.

In one aspect of said antifoam composition, said antifoam composition comprises, based upon total composition weight:
a) about 35% to about 75%, preferably about 40% to about 75%, more preferably about 50% to about 75% of an organomodified silicone;
b) from about 1.5 to about 4.0% silicone resin;
c) from about 2% to about 8%, preferably from about 3% to about 6%, more preferably from about 4% to about 5% silica, preferably said silica comprises hydrophobized silica;
d) from 0% to about 10% solvent, preferably from about 0.1% to about 8%, more preferably from about 1% to about 5%; and
e) 20% or greater, from 20% to about 30%, preferably from about 21% to about 27%, more preferably from about 22% to about 26%, most preferably of from about 23% to about 26%, siloxane polymer based on the weight of said organomodified silicone; or 20% or greater, from 30% to about 80%, preferably from about 40% to about 70%, more preferably from about 45% to about 60%, siloxane polymer based on the weight of said organomodified silicone.

In one aspect of said antifoam composition, said antifoam composition is in a solid form preferably in a form selected from the group consisting of a powder, an agglomerate, and mixtures thereof.

A consumer product comprising the antifoam composition of any preceding claim and an adjunct ingredient, preferably, said consumer product is a fabric and home care product, in one aspect, said fabric and home care product is a liquid detergent, is disclosed.

In one aspect of said consumer product, including said fabric and home care product variant of said consumer product, said adjunct ingredient is selected from the group consisting of surfactants, color care polymers, deposition aids, surfactant boosting polymers, pH adjuster, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments.

In one aspect of said consumer product, including said fabric and home care product variant of said consumer product, said surfactant is selected from the group consisting of anionic surfactant, cationic surfactant, nonionic surfactant, zwitterionic surfactant, ampholytic surfactant and mixtures thereof.

In one aspect of said consumer product, including said fabric and home care product variant of said consumer product, said consumer product comprises an anionic surfactant.

In one aspect of said consumer product, including said fabric and home care product variant of said consumer product, said anionic surfactant is selected from the group consisting of a $C_9$-$C_{18}$ alkyl benzene sulfonate surfactant; a $C_{10}$-$C_{20}$ alkyl sulfate surfactant; a $C_{10}$-$C_{18}$ alkyl alkoxy sulfate surfactant, said $C_{10}$-$C_{18}$ alkyl alkoxy sulfate surfactant having an average degree of alkoxylation of from 1 to 30 and the alkoxy comprises a $C_1$-$C_4$ chain, and mixtures thereof.

In one aspect of said consumer product, including said fabric and home care product variant of said consumer product:
a) said fabric softener active is selected from the group consisting of polyglycerol esters, oily sugar derivatives, wax emulsions, fatty acids, N,N-bis(stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxyethyl)N-methyl ammonium methylsulfate and mixtures thereof;
b) said deposition aid polymer comprises a cationic polymer having a cationic charge of from about 0.005 meq/g to about 23 meq/g, preferably of from about 0.01 meq/g to about 12 meq/g, most preferably of from about 0.1 meq/g to about 7 meq/g at the pH of said composition;
c) said perfume delivery system comprises components selected from the group consisting of a perfume microcapsule, or a moisture-activated perfume microcapsule, wherein the microcapsule comprises a shell comprising a polyacrylate and/or a polymer crosslinked with an aldehyde, preferably said shell comprises a polymer selected from the group consisting of a polyacrylate, polyurea, polyurethane, polyamine, urea crosslinked with an aldehyde, or melamine crosslinked with an aldehyde, more preferably said polymer is selected from the group consisting of melamine-formaldehyde, urea-formaldehyde, phenol-formaldehyde, or other condensation polymers with formaldehyde, a perfume carrier and an encapsulated perfume composition, wherein said perfume carrier may be selected from the group consisting of cyclodextrins, starch microcapsules, porous carrier microcapsules, and mixtures thereof; and wherein said encapsulated perfume composition may comprise low volatile perfume ingredients, high volatile perfume ingredients, and mixtures thereof;
d) said enzyme is selected from the group consisting of protease, amylase, lipase, mannanase, cellulase, xyloglucanase, pectate lyase, and mixtures thereof;
e) said structurant is selected from the group of hydrogenated castor oil; derivatives of hydrogenated castor oil; microfibrillar cellulose; hydroxyfunctional crystalline materials, long-chain fatty alcohols, 12-hydroxystearic acid; clays; and mixtures thereof;
f) said polymeric dispersing agent is selected from the group consisting of polycarboxylates, soil release polymers, carboxymethylcelluloses, poly(vinyl-pyrrolidone), poly(ethylene glycol), poly(vinyl alcohol), poly(vinylpyridine-N-oxide), poly(vinylimidazole), zwitterionic ethoxylated quaternized sulfated hexamethylene diamine, alkoxylated polyalkylenimine, ethoxylated polyamine, polyethylene glycol-polyvinylacetate;
g) said hueing agent is selected from the group consisting of from the group consisting of small molecule dyes, polymeric dyes, dye clay conjugates and pigments;
h) said oligoamine is selected from the group consisting of polyetheramines; and
i) mixtures thereof.

A consumer product wherein said antifoam composition's organomodified silicone comprises 27 to 33 mole percent 2-phenylpropylmethyl moieties, and/or said ratio of siloxane polymer to organomodified silicone is from 1:5 to 1:3, said consumer product being a detergent and/or fabric softener.

A consumer product, wherein each $R^2$ is independently selected from the group consisting of H, an aromatic hydrocarbon radical covalently attached to silicon via aliphatic groups, a monovalent, optionally substituted, aromatic hydrocarbon radical which is attached to the silicon atom via a carbon ring atom; a monovalent, SiC-bonded, optionally substituted, aliphatic hydrocarbon radical that optionally comprises a heteroatom; a monovalent, Si—X—C-bonded, optionally substituted, aliphatic hydrocarbon radical wherein X is a heteroatom, preferably X is sulfur, nitrogen or phosphorus; —SH; and —NH$_2$, said consumer product being a detergent and/or fabric softener.

In one aspect of said consumer product, said consumer product comprise and adjunct ingredient, preferably said adjunct ingredient is selected from the group consisting of surfactants, color care polymers, deposition aids, surfactant boosting polymers, pH adjuster, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments.

In one aspect of said consumer product, said surfactant is selected from the group consisting of anionic surfactant, cationic surfactant, nonionic surfactant, zwitterionic surfactant, ampholytic surfactant and mixtures thereof.

In one aspect of said consumer product, said consumer product comprises an anionic surfactant.

In one aspect of said consumer product, said anionic surfactant is selected from the group consisting of a $C_9$-$C_{18}$ alkyl benzene sulfonate surfactant; a $C_{10}$-$C_{20}$ alkyl sulfate surfactant; a $C_{10}$-$C_{18}$ alkyl alkoxy sulfate surfactant, said $C_{10}$-$C_{18}$ alkyl alkoxy sulfate surfactant having an average degree of alkoxylation of from 1 to 30 and the alkoxy comprises a $C_1$-$C_4$ chain, and mixtures thereof.

In one aspect of said consumer product:
a) said fabric softener active is selected from the group consisting of polyglycerol esters, oily sugar derivatives, wax emulsions, fatty acids, N,N-bis(stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxy-ethyl)N-methyl ammonium methylsulfate and mixtures thereof;
b) said deposition aid polymer comprises a cationic polymer having a cationic charge of from about 0.005 meq/g to about 23 meq/g, preferably of from about 0.01 meq/g to about 12 meq/g, most preferably of from about 0.1 meq/g to about 7 meq/g at the pH of said composition;
c) said perfume delivery system comprises components selected from the group consisting of a perfume microcapsule, or a moisture-activated perfume microcapsule, wherein the microcapsule comprises a shell comprising a polyacrylate and/or a polymer crosslinked with an aldehyde, preferably said shell comprises a polymer selected from the group consisting of a polyacrylate, polyurea, polyurethane, polyamine, urea crosslinked with an aldehyde, or melamine crosslinked with an aldehyde, more preferably said polymer is selected from the group consisting of melamine-formaldehyde, urea-formaldehyde, phenol-formaldehyde, or other condensation polymers with formaldehyde, a perfume carrier and an encapsulated perfume composition, wherein said perfume carrier may be selected from the group consisting of cyclodextrins, starch microcapsules, porous carrier microcapsules, and mixtures thereof; and wherein said encapsulated perfume composition may comprise low volatile perfume ingredients, high volatile perfume ingredients, and mixtures thereof;
d) said enzyme is selected from the group consisting of protease, amylase, lipase, mannanase, cellulase, xyloglucanase, pectate lyase, and mixtures thereof;
e) said structurant is selected from the group of hydrogenated castor oil; derivatives of hydrogenated castor oil; microfibrillar cellulose; hydroxyfunctional crystalline materials, long-chain fatty alcohols, 12-hydroxystearic acid; clays; and mixtures thereof;
f) said polymeric dispersing agent is selected from the group consisting of polycarboxylates, soil release polymers, carboxymethylcelluloses, poly(vinyl-pyrrolidone), poly(ethylene glycol), poly(vinyl alcohol), poly(vinylpyridine-N-oxide), poly(vinylimidazole), zwitterionic ethoxylated quaternized sulfated hexamethylene diamine, alkoxylated polyalkylenimine, ethoxylated polyamine, polyethylene glycol-polyvinylacetate;
g) said hueing agent is selected from the group consisting of small molecule dyes, polymeric dyes, dye clay conjugates and pigments;
h) said oligoamine is selected from the group consisting of polyetheramines; and
i) mixtures thereof.

Fabric and Home Care Products

A composition comprising an adjunct ingredient and an antifoam, said antifoam comprising:

a) an organomodified silicone comprising one or more 2-phenylpropylmethyl moieties, preferably 1 to 75 mole percent 2-phenylpropylmethyl moieties, more preferably 5 to 50 mole percent 2-phenylpropylmethyl moieties, more preferably 5 to 40 mole percent 2-phenylpropylmethyl moieties, more, preferably 15 to 35 mole percent 2-phenylpropylmethyl moieties most preferably, said organomodified silicone comprises 27 to 33 mole percent 2-phenylpropylmethyl moieties;
b) silica;
c) a siloxane polymer, said siloxane polymer having a solubility index of greater than about 0.8, more preferably greater than 0.85, more preferably greater than 0.9, more preferably greater than 0.95, greater than 0.98, most preferably from about 0.8 to 1.25 and having a viscosity of from about 0.5 cSt to about 10,000 cSt, of from about 0.5 cSt to about 5,000 cSt, of from about 0.5 cSt to about 1,000 cSt, of from about 2 cSt to about 1,000 cSt, preferably of from about 1 cSt to about 750 cSt, more preferably of from about 1 cSt to about 500 cSt, more preferably of from about 1 cSt to about 100 cSt, most preferably of from about 1 cSt to about 20 cSt; said siloxane polymer having a viscosity that is about 5%, more preferably about 10%, more preferably about 20%, more preferably about 40%, more preferably about 50%, more preferably about 60%, more preferably about 75%, more preferably about 90%, most preferably about 99%, less than that of said organomodified silicone; and
d) a silicone resin;
said antifoam composition having a viscosity, at a shear rate of 20 sec$^{-1}$ at 25° C., of from about 250 cSt to about 20,000 cSt, preferably of from about 500 cSt to about 10,000 cSt, more preferably of from about 1,000 cSt to about 7,000 cSt, most preferably of from about 1,000 cSt to about 4,000 cSt; a ratio of organomodified silicone to silica of from about 2:1 to about 500:1, preferably of from about 3:1 to about 100:1, more preferably of from about 4:1 to about 70:1, most preferably of from about 5:1 to about 50:1
said composition being a fabric and home care product, preferably said composition is a detergent and/or fabric softener, more preferably said composition is a liquid detergent, is disclosed.

Preferably said composition's antifoam's siloxane polymer comprises a polydimethyl siloxane polymer having a viscosity of from about 0.5 cSt to about 1,000 cSt, more preferably of from about 1 cSt to about 750 cSt, more preferably of from about 1 cSt to about 500 cSt, more preferably of from about 1 cSt to about 100 cSt, most preferably of from about 1 cSt to about 20 cSt.

Preferably said composition's antifoam has a ratio of siloxane polymer to organomodified silicone of from 1:4 to 4:1, preferably from 1:3.8 to 3:2, more preferably from 1:3.6 to 2:3 or most preferably from 1:3 to 2:3.

Preferably said composition's antifoam's organomodified silicone comprises units of the following formula (I):

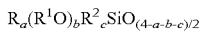  Formula (I)

wherein:
a) each R is independently selected from: H, an aromatic hydrocarbon radical covalently attached to silicon via aliphatic groups, or a monovalent, SiC-bonded, optionally substituted, aliphatic hydrocarbon radical that optionally comprises a heteroatom;
b) each R$^1$ is independently selected from: H, or a monovalent, optionally substituted aliphatic hydrocarbon radical, that optionally comprises a heteroatom;
c) each R$^2$ is independently selected from the group consisting of H, an aromatic hydrocarbon radical covalently attached to silicon via aliphatic groups, a monovalent, optionally substituted, aromatic hydrocarbon radical which is attached to the silicon atom via a carbon ring atom and a monovalent, SiC-bonded, optionally substituted, aliphatic hydrocarbon radical that optionally comprises a heteroatom;
d) the index a is 0, 1, 2 or 3;
e) the index b is 0, 1, 2 or 3;
f) the index c is 0, 1, 2 or 3;
with the proviso that the sum of a+b+c is an integer from 0 to 3.

Preferably said composition's anti-foam's silica comprises hydrophobic, precipitated silica and/or hydrophobic, fumed silica.

Preferably said composition's anti-foam's siloxane polymer has a viscosity of less than 20 cSt, more preferably of from about 0.5 cSt to about 19 cSt, more preferably of from about 1 cSt to about 15 cSt, most preferably of from about 1.5 cSt to about 12 cSt, preferably, said siloxane polymer comprises polydimethylsiloxane.

Preferably said composition's anti-foam's silicone resin comprises units of formula (II) below:

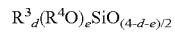  Formula (II)

wherein:
a) each R$^3$ is independently selected from H, a monovalent, SiC-bonded, optionally substituted, aliphatic hydrocarbon radical that optionally comprises a heteroatom, or an aromatic hydrocarbon radical covalently attached to silicon via aliphatic groups;
b) each R$^4$ is independently selected from H, or a monovalent, optionally substituted aliphatic hydrocarbon radical, that optionally comprises a heteroatom;
c) the index d is 0, 1, 2 or 3; and
d) the index e is 0, 1, 2 or 3;
with the proviso that the sum of d+e is an integer from 0 to 3.

Preferably said composition's, said anti-foam comprises:
a) 50-75% organomodified silicone;
b) 1.5-4.0% silicone resin;
c) 15-40% of siloxane polymer;
d) 4-8% silica; and
e) 0-4% solvent.

Preferably said composition's anti-foam's ratio of organomodified silicone to silica is from about 8:1 to about 15:1.

Preferably said composition's anti-foam comprises, based upon total antifoam composition weight:
a) about 35% to about 75%, preferably about 40% to about 75%, more preferably about 50% to about 75% of an organomodified silicone;
b) from about 1.5 to about 4.0% silicone resin;
c) from about 2% to about 8%, preferably from about 3% to about 6%, more preferably from about 4% to about 5% silica, preferably said silica comprises hydrophobized silica;
d) from 0% to about 10% solvent, preferably from about 0.1% to about 8%, more preferably from about 1% to about 5%; and
e) 20% or greater, from 20% to about 30%, preferably from about 21% to about 27%, more preferably from about 22% to about 26%, most preferably of from about 23% to about 26%, siloxane polymer based on the weight of said organomodified silicone; or 20% or greater, from 30% to about 80%, preferably from about 40% to about 70%, more preferably from about 45% to about 60%, siloxane polymer based on the weight of said organomodified silicone.

Preferably said composition's antifoam is in a solid form, preferably in a form selected from the group consisting of a powder, an agglomerate, and mixtures thereof.

Preferably said composition's adjunct ingredient is selected from the group consisting of surfactants, color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments.

Preferably said composition comprises a surfactant selected from the group consisting of anionic surfactant, cationic surfactant, nonionic surfactant, zwitterionic surfactant, ampholytic surfactant and mixtures thereof.

Preferably said composition comprises an anionic surfactant.

Preferably said composition comprises an anionic surfactant selected from the group consisting of a $C_9$-$C_{18}$ alkyl benzene sulfonate surfactant; a $C_{10}$-$C_{20}$ alkyl sulfate surfactant; a $C_{10}$-$C_{18}$ alkyl alkoxy sulfate surfactant, said $C_{10}$-$C_{18}$ alkyl alkoxy sulfate surfactant having an average degree of alkoxylation of from 1 to 30 and the alkoxy comprises a $C_1$-$C_4$ chain, and mixtures thereof.

Preferably said composition comprises:
a) a fabric softener active is selected from the group consisting of polyglycerol esters, oily sugar derivatives, wax emulsions, fatty acids, N,N-bis(stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxy-ethyl)N-methyl ammonium methylsulfate and mixtures thereof;
b) said deposition aid polymer comprises a cationic polymer having a cationic charge of from about 0.005 meq/g to about 23 meq/g, preferably of from about 0.01 meq/g to about 12 meq/g, most preferably of from about 0.1 meq/g to about 7 meq/g at the pH of said composition;
c) said perfume delivery system comprises components selected from the group consisting of a perfume microcapsule, or a moisture-activated perfume microcapsule, wherein the microcapsule comprises a shell comprising a polyacrylate and/or a polymer crosslinked with an aldehyde, preferably said shell comprises a polymer selected from the group consisting of a polyacrylate, polyurea, polyurethane, polyamine, urea crosslinked with an aldehyde, or melamine crosslinked with an aldehyde, more preferably said polymer is selected from the group consisting of melamine-formaldehyde, urea-formaldehyde, phenol-formaldehyde, or other condensation polymers with formaldehyde, a perfume carrier and an encapsulated perfume composition, wherein said perfume carrier may be selected from the group consisting of cyclodextrins, starch microcapsules, porous carrier microcapsules, and mixtures thereof; and wherein said encapsulated perfume composition may comprise low volatile perfume ingredients, high volatile perfume ingredients, and mixtures thereof;
d) said enzyme is selected from the group consisting of protease, amylase, lipase, mannanase, cellulase, xyloglucanase, pectate lyase, and mixtures thereof;
e) said structurant is selected from the group of hydrogenated castor oil; derivatives of hydrogenated castor oil; microfibrillar cellulose; hydroxyfunctional crystalline materials, long-chain fatty alcohols, 12-hydroxystearic acid; clays; and mixtures thereof;
f) said polymeric dispersing agent is selected from the group consisting of polycarboxylates, soil release polymers, carboxymethylcelluloses, poly(vinyl-pyrrolidone), poly(ethylene glycol), poly(vinyl alcohol), poly(vinylpyridine-N-oxide), poly(vinylimidazole), zwitterionic ethoxylated quaternized sulfated hexamethylene diamine, alkoxylated polyalkylenimine, ethoxylated polyamine, polyethylene glycol-polyvinylacetate;
g) said hueing agent is selected from the group consisting of small molecule dyes, polymeric dyes, dye clay conjugates and pigments; and
h) said oligoamine is selected from the group consisting of polyetheramines, and
i) mixtures thereof.

Preferably said composition's antifoam's organomodified silicone comprises 27 to 33 mole percent 2-phenylpropylmethyl moieties. Preferably each $R^2$ moiety of said organomodified silicone is independently selected from the group consisting of H, an aromatic hydrocarbon radical covalently attached to silicon via aliphatic groups, a monovalent, optionally substituted, aromatic hydrocarbon radical which is attached to the silicon atom via a carbon ring atom; a monovalent, SiC-bonded, optionally substituted, aliphatic hydrocarbon radical that optionally comprises a heteroatom; a monovalent, Si—X—C-bonded, optionally substituted, aliphatic hydrocarbon radical wherein X is a heteroatom, preferably X is sulfur, nitrogen or phosphorus; —SH; and —$NH_2$.

Preferably said composition comprises, based on total composition weight from about 0.01% to about 5.0%, preferably from about 0.02% to about 2%, more preferably from about 0.05% to about 1% of said anti-foam Process of Making The antifoam composition's disclosed and/or claimed herein can be made by in accordance with the teachings of the present specification, including the examples. In one aspect, when the silica requires in situ hydrophobization, the antifoam composition production process can include a heating step in which the silica, organomodified silicone, silicone resin, and/or other treating agent are mixed together at elevated temperature in the presence of a suitable catalyst such as potassium methoxide, potassium hydroxide, sodium methoxide and sodium hydroxide.

The consumer products disclosed and/or claimed herein can be made by in accordance with the teachings of the present specification, including the examples. In one aspect, such consumer can be made by combining one or more of antifoam compositions disclosed and/or claimed herein with an adjunct ingredient Method of Use In one aspect, a method of treating and/or cleaning a situs, said method comprising
a) optionally washing and/or rinsing said situs;
b) contacting said situs with an antifoam composition and/or a consumer product disclosed or claimed in the present specification;
c) optionally washing and/or rinsing said situs; and
d) optionally drying said situs via passive or active drying is disclosed.

Adjunct Materials

While not essential for each consumer product embodiment of the present invention, the non-limiting list of adjuncts illustrated hereinafter are suitable for use in the instant consumer products and may be desirably incorporated in certain embodiments of the invention, for example to assist or enhance performance, for treatment of the substrate to be cleaned, or to modify the aesthetics of the composition as is the case with perfumes, colorants, dyes or the like. The precise nature of these additional components, and levels of incorporation thereof, will depend on the physical form of the composition and the nature of the operation for which it is to be used. Suitable adjunct materials include, but are not limited to, surfactants, color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments.

As stated, the adjunct ingredients are not essential for each consumer product embodiment of the present invention. Thus, certain embodiments of Applicants' compositions do not contain one or more of the following adjuncts materials: surfactants, color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/ anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments. However, when one or more adjuncts is present, such one or more adjuncts may be present as detailed below.

Surfactants

In some examples, the additional surfactant comprises one or more anionic surfactants. In some examples, the additional surfactant may consist essentially of, or even consist of one or more anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Alkoxylated alkyl sulfate materials comprise ethoxylated alkyl sulfate surfactants, also known as alkyl ether sulfates or alkyl polyethoxylate sulfates. Examples of ethoxylated alkyl sulfates include water-soluble salts, particularly the alkali metal, ammonium and alkylolammonium salts, of organic sulfuric reaction products having in their molecular structure an alkyl group containing from about 8 to about 30 carbon atoms and a sulfonic acid and its salts. (Included in the term "alkyl" is the alkyl portion of acyl groups. In some examples, the alkyl group contains from about 15 carbon atoms to about 30 carbon atoms. In other examples, the alkyl ether sulfate surfactant may be a mixture of alkyl ether sulfates, said mixture having an average (arithmetic mean) carbon chain length within the range of about 12 to 30 carbon atoms, and in some examples an average carbon chain length of about 12-15 carbon atoms, and an average (arithmetic mean) degree of ethoxylation of from about 1 mol to 4 mols of ethylene oxide, and in some examples an average (arithmetic mean) degree of ethoxylation of about 1.8 mols to about 4 mols of ethylene oxide. In further examples, the alkyl ether sulfate surfactant may have a carbon chain length between about 10 carbon atoms to about 18 carbon atoms, and a degree of ethoxylation of from about 1 to about 6 mols of ethylene oxide. In yet further examples, the alkyl ether sulfate surfactant may contain a peaked ethoxylate distribution, Non-ethoxylated alkyl sulfates may also be added to the disclosed cleaning compositions and used as an anionic surfactant component. Examples of non-alkoxylated, e.g., non-ethoxylated, alkyl sulfate surfactants include those produced by the sulfation of higher $C_8$-$C_{20}$ fatty alcohols. In some examples, primary alkyl sulfate surfactants have the general formula: $ROSO_3^-M^+$, wherein R is typically a linear $C_8$-$C_{20}$ hydrocarbyl group, which may be straight chain or branched chain, and M is a water-solubilizing cation. In some examples, R is a $C_{10}$-$C_{15}$ alkyl, and M is an alkali metal. In other examples, R is a $C_{12}$-$C_{14}$ alkyl and M is sodium.

Other useful anionic surfactants can include the alkali metal salts of alkyl benzene sulfonates, in which the alkyl group contains from about 9 to about 15 carbon atoms, in straight chain (linear) or branched chain configuration. In some examples, the alkyl group is linear. Such linear alkylbenzene sulfonates are known as "LAS." In other examples, the linear alkylbenzene sulfonate may have an average number of carbon atoms in the alkyl group of from about 11 to 14. In a specific example, the linear straight chain alkyl benzene sulfonates may have an average number of carbon atoms in the alkyl group of about 11.8 carbon atoms, which may be abbreviated as C11.8 LAS.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Nonionic Surfactants

In some aspects, the additional surfactant comprises one or more nonionic surfactants. In certain aspects, the detergent composition comprises from about 0.1% to about 40%, by weight of the composition, of an additional surfactant selected from one or more nonionic surfactants. In certain aspects, the detergent composition comprises from about 0.1% to about 15%, by weight of the composition, of an additional surfactant selected from one or more nonionic surfactants. In further aspects, the detergent composition comprises from about 0.3% to about 10%, by weight of the composition, of an additional surfactant selected from one or more nonionic surfactants.

Suitable nonionic surfactants useful herein can comprise any conventional nonionic surfactant. These can include, for e.g., alkoxylated fatty alcohols and amine oxide surfactants. In some examples, the cleaning compositions may contain an ethoxylated nonionic surfactant. The nonionic surfactant may be selected from the ethoxylated alcohols and ethoxylated alkyl phenols of the formula $R(OC_2H_4)_n OH$, wherein R is selected from the group consisting of aliphatic hydrocarbon radicals containing from about 8 to about 17 carbon atoms and alkyl phenyl radicals in which the alkyl groups contain from about 8 to about 12 carbon atoms, and the average value of n is from about 5 to about 15. In one example, the nonionic surfactant is selected from ethoxylated alcohols having an average of about 24 carbon atoms in the alcohol and an average degree of ethoxylation of about 9 moles of ethylene oxide per mole of alcohol.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, alkylpolysaccharides, Polyhydroxy fatty acid amides and ether capped poly(oxyalkylated) alcohol surfactants Suitable nonionic detersive surfactants also include alkyl polyglucoside and alkyl alkoxylated alcohol. Suitable nonionic surfactants also include those sold under the trade name Lutensol® from BASF.

In some aspects, the nonionic surfactant is selected from alkyl alkoxylated alcohols, such as a $C_{8-18}$ alkyl alkoxylated alcohol, for example, a $C_{8-18}$ alkyl ethoxylated alcohol. The alkyl alkoxylated alcohol may have an average degree of alkoxylation of from about 1 to about 50, or from about 1 to about 30, or from about 1 to about 20, or from about 1 to about 10. In certain aspects, the alkyl alkoxylated alcohol is a $C_{8-18}$ alkyl ethoxylated alcohol having an average degree of ethoxylation of from about 1 to about 10, or from about 1 to about 7, or from about 1 to about 5, or from about 3 to about 7. The alkyl alkoxylated alcohol can be linear or branched, substituted or unsubstituted.

Cationic Surfactants

In some examples, the additional surfactant comprises one or more cationic surfactants.

In certain aspects, the detergent composition comprises from about 0.1% to about 10%, by weight of the composition, of an additional surfactant selected from one or more cationic surfactants. In certain aspects, the detergent composition comprises from about 0.1% to about 7%, by weight of the composition, of an additional surfactant selected from one or more cationic surfactants. In further aspects, the detergent composition comprises from about 0.3% to about 5%, by weight of the composition, of an additional surfactant selected from one or more cationic surfactants. In some aspects, the cleaning compositions of the invention are substantially free of cationic surfactants and surfactants that become cationic below a pH of 7 or below a pH of 6.

Non-limiting examples of cationic surfactants include: the quaternary ammonium surfactants, which can have up to 26 carbon atoms include: alkoxylate quaternary ammonium (AQA) surfactants, dimethyl hydroxyethyl lauryl ammonium chloride; polyamine cationic surfactants; cationic ester surfactants and amino surfactants, specifically amido propyldimethyl amine (APA) and/or trimethylammonium C8-16 alkyl salt.

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

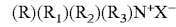

$(R)(R_1)(R_2)(R_3)N^+X^-$ wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Zwitterionic Surfactants

Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Specific examples include $C_8$ to $C_{18}$ (for example from $C_{12}$ to $C_{18}$) amine oxides and sulfo and hydroxy betaines, such as N-alkyl-N,N-dimethylammino-1- propane sulfonate where the alkyl group can be $C_8$ to $C_{18}$ and in certain embodiments from $C_{10}$ to $C_{14}$.

Amphoteric Surfactants

Examples of amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis(2-hydroxyethyl)-2-sulfato-3-dodecoxypropylamine. Suitable amphoteric surfactants also include sarcosinates, glycinates, taurinates, and mixtures thereof.

Branched Surfactants

In some examples, the surfactant may be a branched surfactant, Suitable branched surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

In some aspects, the branched detersive surfactant is a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$ alkyl groups, typically methyl and/or ethyl groups.

Enzymes

The cleaning compositions described herein may comprise one or more enzymes which provide cleaning performance and/or fabric care benefits. Examples of suitable enzymes include, but are not limited to, hemicellulases, peroxidases, proteases, cellulases, xylanases, lipases, xyloglucanase, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a detergent composition, the aforementioned additional enzymes may be present at levels from about 0.00001% to about 2%, from about 0.0001% to about 1% or even from about 0.001% to about 0.5% enzyme protein by weight of the detergent composition.

In one aspect preferred enzymes would include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii* described in U.S. Pat. No. 6,312,936 B1, U.S. Pat. No. 5,679,630, U.S. Pat. No. 4,760,025, U.S. Pat. No. 7,262,042 and WO09/021867.

(b) trypsin-type or chymotrypsin-type proteases, such as trypsin (e.g., of porcine or bovine origin), including the *Fusarium* protease.

(c) metalloproteases, including those derived from *Bacillus amyloliquefaciens* Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V2051+L217D), BLAP X (BLAP with S3T+V4I+V2051) and BLAP F49 (BLAP with S3T+V4I+A194P+V199M+V2051+L217D)—all from Henkel/Kemira; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) the variants with one or more substitutions in the following positions versus the AA560 enzyme listed as SEQ ID No. 12:

26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with SEQ ID No. 4 in WO06/002643, the wild-type enzyme from *Bacillus* SP722, especially variants with deletions in the 183 and 184 positions and variants described in WO 00/60060, which is incorporated herein by reference.

(d) variants exhibiting at least 95% identity with the wild-type enzyme from *Bacillus* sp. 707 (SEQ ID NO:7 in U.S. Pat. No. 6,093,562), especially those comprising one or more of the following mutations M202, M208, S255, R172, and/or M261. Preferably said amylase comprises one or more of M202L, M202V, M202S, M202T, M202I, M202Q, M202W, S255N and/or R172Q. Particularly preferred are those comprising the M202L or M202T mutations.

(e) variants described in WO 09/149130, preferably those exhibiting at least 90% identity with SEQ ID NO: 1 or SEQ ID NO:2 in WO 09/149130, the wild-type enzyme from *Geobacillus Stearophermophilus* or a truncated version thereof.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases". In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Preferred lipases would include those sold under the tradenames Lipex® and Lipolex®.

In one aspect, other preferred enzymes include microbial-derived endoglucanases exhibiting endo-beta-1,4-glucanase activity (E.C. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403B2) and mixtures thereof. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, Calif.).

Enzyme Stabilizing System

The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, chlorine bleach scavengers and mixtures thereof, and are designed to address different stabilization problems depending on the type and physical form of the cleaning composition. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders

The cleaning compositions of the present invention may optionally comprise a builder. Built cleaning compositions typically comprise at least about 1% builder, based on the total weight of the composition. Liquid cleaning compositions may comprise up to about 10% builder, and in some examples up to about 8% builder, of the total weight of the composition. Granular cleaning compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing cleaning compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O).ySiO_2.zM'O$ wherein M is Na and/or K, M' is Ca and/or Mg; y/x is 0.5 to 2.0; and z/x is 0.005 to 1.0

Alternatively, the composition may be substantially free of builder.

Structurant/Thickeners i. Di-benzylidene Polyol Acetal Derivative

The fluid detergent composition may comprise from about 0.01% to about 1% by weight of a dibenzylidene polyol acetal derivative (DBPA), or from about 0.05% to about 0.8%, or from about 0.1% to about 0.6%, or even from about 0.3% to about 0.5%. Non-limiting examples of suitable DBPA molecules are disclosed in U.S. 61/167,604. In one aspect, the DBPA derivative may comprise a dibenzylidene sorbitol acetal derivative (DBS). Said DBS derivative may be selected from the group consisting of: 1,3:2,4-dibenzylidene sorbitol; 1,3:2,4-di(p-methylbenzylidene) sorbitol; 1,3:2,4-di(p-chlorobenzylidene) sorbitol; 1,3:2,4-di(2,4-dimethyldibenzylidene) sorbitol; 1,3:2,4-di(p-ethylbenzylidene) sorbitol; and 1,3:2,4-di(3,4-dimethyldibenzylidene) sorbitol or mixtures thereof.

ii. Bacterial Cellulose

The fluid detergent composition may also comprise from about 0.005% to about 1% by weight of a bacterial cellulose network. The term "bacterial cellulose" encompasses any type of cellulose produced via fermentation of a bacteria of the genus *Acetobacter* such as CELLULON® by CPKelco U.S. and includes materials referred to popularly as microfibrillated cellulose, reticulated bacterial cellulose, and the like. In one aspect, said fibres have cross sectional dimensions of 1.6 nm to 3.2 nm by 5.8 nm to 133 nm. Additionally, the bacterial cellulose fibres have an average microfibre length of at least about 100 nm, or from about 100 to about 1,500 nm. In one aspect, the bacterial cellulose microfibres have an aspect ratio, meaning the average microfibre length divided by the widest cross sectional microfibre width, of from about 100:1 to about 400:1, or even from about 200:1 to about 300:1.

iii. Coated Bacterial Cellulose

In one aspect, the bacterial cellulose is at least partially coated with a polymeric thickener. In one aspect the at least partially coated bacterial cellulose comprises from about 0.1% to about 5%, or even from about 0.5% to about 3%, by weight of bacterial cellulose; and from about 10% to about 90% by weight of the polymeric thickener. Suitable bacterial cellulose may include the bacterial cellulose described above and suitable polymeric thickeners include: carboxymethylcellulose, cationic hydroxymethylcellulose, and mixtures thereof.

iv. Cellulose Fibers Non-Bacterial Cellulose Derived

In one aspect, the composition may further comprise from about 0.01 to about 5% by weight of the composition of a cellulosic fiber. Said cellulosic fiber may be extracted from vegetables, fruits or wood. Commercially available examples are Avicel® from FMC, Citri-Fi from Fiberstar or Betafib from Cosun.

v. Non-Polymeric Crystalline Hydroxyl-Functional Materials

In one aspect, the composition may further comprise from about 0.01 to about 1% by weight of the composition of a non-polymeric crystalline, hydroxyl functional structurant. Said non-polymeric crystalline, hydroxyl functional structurants generally may comprise a crystallizable glyceride which can be pre-emulsified to aid dispersion into the final fluid detergent composition. In one aspect, crystallizable glycerides may include hydrogenated castor oil or "HCO" or derivatives thereof, provided that it is capable of crystallizing in the liquid detergent composition.

vi. Polymeric Structuring Agents

Fluid detergent compositions of the present invention may comprise from about 0.01% to about 5% by weight of a naturally derived and/or synthetic polymeric structurant. Examples of naturally derived polymeric structurants of use in the present invention include: hydroxyethyl cellulose, hydrophobically modified hydroxyethyl cellulose, carboxymethyl cellulose, polysaccharide derivatives and mixtures thereof. Suitable polysaccharide derivatives include: pectine, alginate, arabinogalactan (gum Arabic), carrageenan, gellan gum, xanthan gum, guar gum and mixtures thereof. Examples of synthetic polymeric structurants of use in the present invention include: polycarboxylates, polyacrylates, hydrophobically modified ethoxylated urethanes, hydrophobically modified non-ionic polyols and mixtures thereof. In one aspect, said polycarboxylate polymer is a polyacrylate, polymethacrylate or mixtures thereof. In another aspect, the polyacrylate is a copolymer of unsaturated mono- or di-carbonic acid and $C_1$-$C_{30}$ alkyl ester of the (meth)acrylic acid. Said copolymers are available from Noveon inc under the tradename Carbopol Aqua 30.

vii. Di-Amido-Gellants

In one aspect, the external structuring system may comprise a di-amido gellant having a molecular weight from about 150 g/mol to about 1,500 g/mol, or even from about 500 g/mol to about 900 g/mol. Such di-amido gellants may comprise at least two nitrogen atoms, wherein at least two of said nitrogen atoms form amido functional substitution groups. In one aspect, the amido groups are different. In another aspect, the amido functional groups are the same. Non-limiting examples of useful di-amido gellants are: N,N'-(2S,2'S)-1,1'-(dodecane-1,12-diylbis(azanediyl))bis(3-methyl-1-oxobutane-2,1-diyl)diisonicotinamide; dibenzyl (2S,2'S)-1,1'-(propane-1,3-diylbis(azanediyl))bis(3-methyl-1-oxobutane-2,1-diyl)dicarbamate; and dibenzyl (2S,2'S)-1, 1'-(dodecane-1,12-diylbis(azanediyl))bis(1-oxo-3-phenylpropane-2,1-diyl)dicarbamate.

Polymeric Dispersing Agents

The detergent composition may comprise one or more polymeric dispersing agents. Examples are carboxymethylcellulose, poly(vinyl-pyrrolidone), poly(ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The detergent composition may comprise one or more amphiphilic cleaning polymers such as the compound having the following general structure: bis(($C_2H_5O$)($C_2H_4O$)n) ($CH_3$)—$N^+$—C—$H_{2x}$—$N^+$—($CH_3$)-bis(($C_2H_5O$)($C_2H_4O$)n), wherein n=from 20 to 30, and x=from 3 to 8, or sulphated or sulphonated variants thereof.

The detergent composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure. These may comprise alkoxylated polyalkylenimines, for example, having an inner polyethylene oxide block and an outer polypropylene oxide block. Such compounds may include, but are not limited to, ethoxylated polyethyleneimine, ethoxylated hexamethylene diamine, and sulfated versions thereof. Polypropoxylated derivatives may also be included. A wide variety of amines and polyalklyeneimines can be alkoxylated to various degrees. A useful example is 600 g/mol polyethyleneimine core ethoxylated to 20 EO groups per NH and is available from BASF. The cleaning compositions described herein may comprise from about 0.1% to about 10%, and in some examples, from about 0.1% to about 8%, and in other examples, from about 0.1% to about 6%, by weight of the cleaning composition, of alkoxylated polyamines.

Alkoxylated polycarboxylates such as those prepared from polyacrylates are useful herein to provide additional grease removal performance. Chemically, these materials comprise polyacrylates having one ethoxy side-chain per every 7-8 acrylate units. The side-chains are of the formula —($CH_2CH_2O$)$_m$ ($CH_2$)—$CH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. The detergent compositions described herein may comprise from about 0.1% to about 10%, and in some examples, from about 0.25% to about 5%, and in other examples, from about 0.3% to about 2%, by weight of the cleaning composition, of alkoxylated polycarboxylates.

Suitable amphilic graft co-polymer preferable include the amphilic graft co-polymer comprises (i) polyethyeene glycol backbone; and (ii) and at least one pendant moiety selected from polyvinyl acetate, polyvinyl alcohol and mixtures thereof. A preferred amphilic graft co-polymer is Sokalan® HP22, supplied from BASF. Suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone is typically about 6000 and the weight ratio of the polyethylene oxide to polyvinyl acetate is about 40 to 60 and no more than 1 grafting point per 50 ethylene oxide units.

Carboxylate polymer—The detergent compositions of the present invention may also include one or more carboxylate polymers such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da.

Soil release polymer—The detergent compositions of the present invention may also include one or more soil release polymers having a structure as defined by one of the following structures (I), (II) or (III):

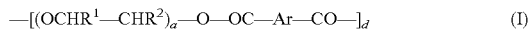  (I)

  (II)

  (III)

wherein:
a, b and c are from 1 to 200;
d, e and f are from 1 to 50;

Ar is a 1,4-substituted phenylene;
sAr is 1,3-substituted phenylene substituted in position 5 with $SO_3Me$;
Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;
$R^1$, $R^2$, $R^3$, $R^4$, $R^5$ and $R^6$ are independently selected from H or $C_1$-$C_{18}$ n- or iso-alkyl; and
$R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex® polymers, including Repel-o-tex® SF, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest® polymers, such as Marloquest® SL supplied by Sasol.

Cellulosic polymer—The consumer products of the present invention may also include one or more cellulosic polymers including those selected from alkyl cellulose, alkyl alkoxyalkyl cellulose, carboxyalkyl cellulose, alkyl carboxyalkyl cellulose. In one aspect, the cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da.

Amines
Various amines may be used in the cleaning compositions described herein for added removal of grease and particulates from soiled materials. The detergent compositions described herein may comprise from about 0.1% to about 10%, in some examples, from about 0.1% to about 4%, and in other examples, from about 0.1% to about 2%, by weight of the cleaning composition, of additional amines. Non-limiting examples of amines include, but are not limited to, polyamines, oligoamines, triamines, diamines, pentamines, tetraamines, polyetheramines, or combinations thereof. Specific examples of suitable additional amines include tetraethylenepentamine, triethylenetetraamine, diethylenetriamine, polyetheramines, or a mixture thereof. In one aspect, The compositions described herein may comprise a polyetheramine for added removal of grease and particulates from soiled materials. In one aspect, the compositions described herein may comprise from about 0.1% to about 10%, in some examples, from about 0.1% to about 6% or from about 0.2% to about 5% or from about 0.1% to about 2%, and in other examples, from about 0.5% to about 3% by weight of the cleaning composition, of a polyetheramine.

A suitable polyetheramine is represented by the structure of Formula (I):

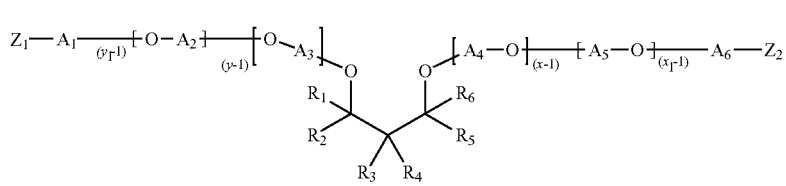

Formula (I)

where each of $R_1$-$R_6$ is independently selected from H, alkyl, cycloalkyl, aryl, alkylaryl, or arylalkyl, where at least one of $R_1$-$R_6$ is different from H, typically at least one of $R_1$-$R_6$ is an alkyl group having 2 to 8 carbon atoms, each of $A_1$-$A_6$ is independently selected from linear or branched alkylenes having 2 to 18 carbon atoms, typically 2 to 10 carbon atoms, more typically, 2 to 5 carbon atoms, each of $Z_1$-$Z_2$ is independently selected from OH or $NH_2$, where at least one of $Z_1$-$Z_2$ is $NH_2$, typically each of $Z_1$ and $Z_2$ is $NH_2$, where the sum of x+y is in the range of about 2 to about 200, typically about 2 to about 20 or about 3 to about 20, more typically about 2 to about 10 or about 3 to about 8 or about 4 to about 6, where x≥1 and y≥1, and the sum of $x_1+y_1$ is in the range of about 2 to about 200, typically about 2 to about 20 or about 3 to about 20, more typically about 2 to about 10 or about 3 to about 8 or about 2 to about 4, where $x_1$≥1 and $y_1$≥1.

Another suitable polyetheramine is represented by the structure of Formula (II):

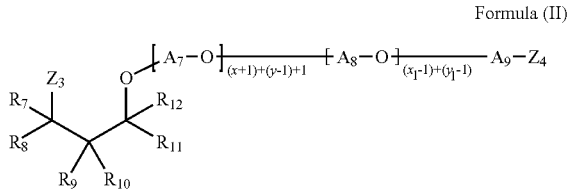

Formula (II)

where each of $R_7$-$R_{12}$ is independently selected from H, alkyl, cycloalkyl, aryl, alkylaryl, or arylalkyl, where at least one of $R_7$-$R_{12}$ is different from H, typically at least one of $R_7$-$R_{12}$ is an alkyl group having 2 to 8 carbon atoms, each of $A_7$-$A_9$ is independently selected from linear or branched alkylenes having 2 to 18 carbon atoms, typically 2 to 10 carbon atoms, more typically, 2 to 5 carbon atoms, each of $Z_3$-$Z_4$ is independently selected from OH or $NH_2$, where at least one of $Z_3$-$Z_4$ is $NH_2$, typically each of $Z_3$ and $Z_4$ is $NH_2$, where the sum of x+y is in the range of about 2 to about 200, typically about 2 to about 20 or about 3 to about 20, more typically about 2 to about 10 or about 3 to about 8 or about 2 to about 4, where x≥1 and y≥1, and the sum of $x_1$+$y_1$ is in the range of about 2 to about 200, typically about 2 to about 20 or about 3 to about 20, more typically about 2 to about 10 or about 3 to about 8 or about 2 to about 4, where $x_1$≥1 and $y_1$≥1.

Another suitable polyetheramine is represented by the structure of Formula III:

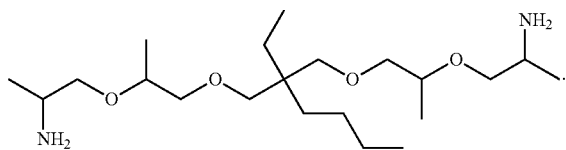

Formula (III)

Solvents—suitable solvents include, but are not limited to, water, alcohol, paraffins, glycols, glycerols, and mixtures thereof.

Bleaching Agents—

The detergent compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the detergent compositions of the present invention may comprise from about 0.1% to about 50% or even from about 0.1% to about 25% bleaching agent by weight of the detergent composition. Examples of suitable bleaching agents include:

(1) photobleaches for example sulfonated zinc phthalocyanine, sulfonated aluminum phthalocyanine, xanthene dyes and mixtures thereof;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxone®, and mixtures thereof. Suitable percarboxylic acids include hydrophobic and hydrophilic peracids having the formula R—(C=O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall fabric and home care product and are typically incorporated into such fabric and home care products as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). While any suitable bleach activator may be employed, in one aspect of the invention the subject detergent composition may comprise NOBS, TAED or mixtures thereof.

When present, the peracid and/or bleach activator is generally present in the detergent composition in an amount of from about 0.1 to about 60 wt %, from about 0.5 to about 40 wt % or even from about 0.6 to about 10 wt % based on the fabric and home care product. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Catalysts—

The detergent compositions of the present invention may also include one or more bleach catalysts capable of accepting an oxygen atom from a peroxyacid and/or salt thereof, and transferring the oxygen atom to an oxidizeable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and mixtures thereof.

In another aspect, the laundry detergent composition comprises a bleach ingredient, the bleach ingredient have a log $P_{o/w}$ no greater than 0, no greater than −0.5, no greater than −1.0, no greater than −1.5, no greater than −2.0, no greater than −2.5, no greater than −3.0, or even no greater than −3.5. The method for determining log $P_{o/w}$ is described in more detail below.

Typically, the bleach ingredient is capable of generating a bleaching species having a $X_{so}$ of from 0.01 to about 0.30, from 0.05 to about 0.25, or even from about 0.10 to 0.20. The method for determining $X_{so}$ is described in more detail below. For example, bleaching ingredients having an isoquinolinium structure are capable of generating a bleaching species that has an oxaziridinium structure. In this example, the $X_{so}$ is that of the oxaziridinium bleaching species.

In one aspect, the bleach catalyst has a structure corresponding to general formula below:

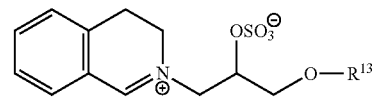

wherein R[13] is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl;

Log $P_{o/w}$, is determined according to the method found in Brooke, D. N., Dobbs, A. J., Williams, N, *Ecotoxicology and Environmental Safety* (1986) 11(3): 251-260. The parameter Xso is determined according to the method described in Adam, W., Haas, W., Lohray, B. B. *Journal of the American Chemical Society* (1991) 113(16) 6202-6208.

Brighteners

Optical brighteners or other brightening or whitening agents may be incorporated at levels of from about 0.01% to about 1.2%, by weight of the composition, into the cleaning compositions described herein. Commercial fluorescent brighteners suitable for the present invention can be classified into subgroups, including but not limited to: derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener herein comprises a compound of formula (1):

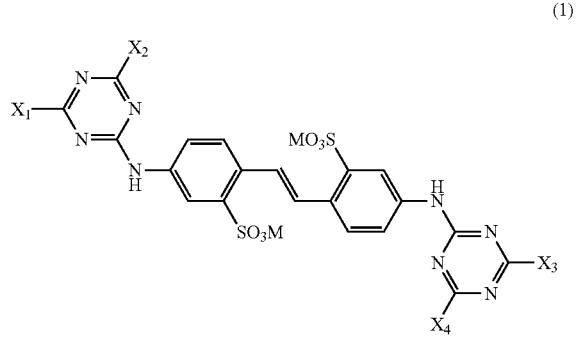

(1)

wherein: $X_1$, $X_2$, $X_3$, and $X_4$ are —N(R$^1$)R$^2$, wherein R$^1$ and R$^2$ are independently selected from a hydrogen, a phenyl, hydroxyethyl, or an unsubstituted or substituted $C_1$-$C_8$ alkyl, or —N(R$^1$)R$^2$ form a heterocyclic ring, preferably R$^1$ and R$^2$ are independently selected from a hydrogen or phenyl, or —N(R$^1$)R$^2$ form a unsubstituted or substituted morpholine ring; and M is a hydrogen or a cation, preferably M is sodium or potassium, more preferably M is sodium.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the trade name Tinopal® AMS-GX by Ciba Geigy Corporation), disodium4,4'-bis {[4-anilino-6-(N-2-bis-hydroxyethyl)-s-triazine-2-yl]-amino}-2,2'-stilbenedisulonate (commercially available under the trade name Tinopal® UNPA-GX by Ciba-Geigy Corporation), disodium 4,4'-bis {[4-anilino-6-(N-2-hydroxyethyl-N-methylamino)-s-triazine-2-yl]-amino}-2,2'-stilbenedisulfonate (commercially available under the trade name Tinopal® 5BM-GX by Ciba-Geigy Corporation). More preferably, the fluorescent brightener is disodium 4,4'-bis{[4-anilino-6-morpholino-s-triazin-2-yl]-amino}-2,2'-stilbenedisulfonate. The brighteners may be added in particulate form or as a premix with a suitable solvent, for example nonionic surfactant, monoethanolamine, propane diol.

Suds Suppressor

The cleaning compositions herein may comprise from 0.1% to about 10%, by weight of the composition, of an additional suds suppressor. When utilized as suds suppressors, monocarboxylic fatty acids, and salts thereof, may be present in amounts of up to about 5% by weight of the cleaning composition, and in some examples, from about 0.5% to about 3% by weight of the cleaning composition. Additional silicone suds suppressors may be utilized in amounts of up to about 2.0% by weight of the cleaning composition, although higher amounts may be used. Monostearyl phosphate suds suppressors may be utilized in amounts ranging from about 0.1% to about 2% by weight of the cleaning composition. Hydrocarbon suds suppressors may be utilized in amounts ranging from about 0.01% to about 5.0% by weight of the cleaning composition, although higher levels can be used. Alcohol suds suppressors may be used at a concentration ranging from about 0.2% to about 3% by weight of the cleaning composition.

Water-Soluble Film

The compositions of the present invention may also be encapsulated within a water-soluble film. Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material. Naturally, different film material and/or films of different thickness may be employed in making the compartments of the present invention. A benefit in selecting different films is that the resulting compartments may exhibit different solubility or release characteristics.

Most preferred film materials are PVA films known under the MonoSol trade reference M8630, M8900, H8779.

The film material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants.

Suds Boosters

If high sudsing is desired, suds boosters such as the $C_{10}$-$C_{16}$ alkanolamides may be incorporated into the cleaning compositions at a concentration ranging from about 1% to about 10% by weight of the cleaning composition. Some examples include the $C_{10}$-$C_{14}$ monoethanol and diethanol amides. If desired, water-soluble magnesium and/or calcium salts such as $MgCl_2$, $MgSO_4$, $CaCl_2$, $CaSO_4$, and the like, may be added at levels of about 0.1% to about 2% by weight of the cleaning composition, to provide additional suds and to enhance grease removal performance.

Conditioning Agents

The composition of the present invention may include a high melting point fatty compound. The high melting point fatty compound useful herein has a melting point of 25° C. or higher, and is selected from the group consisting of fatty alcohols, fatty acids, fatty alcohol derivatives, fatty acid derivatives, and mixtures thereof.

The high melting point fatty compound is included in the composition at a level of from about 0.1% to about 40%, preferably from about 1% to about 30%, more preferably from about 1.5% to about 16% by weight of the composition, from about 1.5% to about 8% in view of providing improved conditioning benefits such as slippery feel during the application to wet hair, softness and moisturized feel on dry hair.

The compositions of the present invention may contain a cationic polymer. Concentrations of the cationic polymer in the composition typically range from about 0.05% to about 3%, in another embodiment from about 0.075% to about 2.0%, and in yet another embodiment from about 0.1% to about 1.0%. Suitable cationic polymers will have cationic charge densities of at least about 0.5 meq/gm, in another embodiment at least about 0.9 meq/gm, in another embodiment at least about 1.2 meq/gm, in yet another embodiment at least about 1.5 meq/gm, but in one embodiment also less than about 7 meq/gm, and in another embodiment less than about 5 meq/gm, at the pH of intended use of the composition, which pH will generally range from about pH 3 to about pH 9, in one embodiment between about pH 4 and about pH 8. Herein, "cationic charge density" of a polymer refers to the ratio of the number of positive charges on the polymer to the molecular weight of the polymer. The average molecular weight of such suitable cationic polymers will generally be between about 10,000 and 10 million, in one embodiment between about 50,000 and about 5 million, and in another embodiment between about 100,000 and about 3 million.

Suitable cationic polymers for use in the compositions of the present invention contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair product performance, stability or aesthetics. Nonlimiting examples of such counterions include halides (e.g., chloride, fluoride, bromide, iodide), sulfate and methylsulfate.

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition.

The composition of the present invention may include a nonionic polymer as a conditioning agent. Polyalkylene glycols having a molecular weight of more than about 1000 are useful herein. Useful are those having the following general formula:

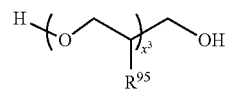

wherein $R^{95}$ is selected from the group consisting of H, methyl, and mixtures thereof. Conditioning agents, and in particular silicones, may be included in the composition. The conditioning agents useful in the compositions of the present invention typically comprise a water insoluble, water dispersible, non-volatile, liquid that forms emulsified, liquid particles. Suitable conditioning agents for use in the composition are those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. Such conditioning agents should be physically and chemically compatible with the essential components of the composition, and should not otherwise unduly impair product stability, aesthetics or performance.

The concentration of the conditioning agent in the composition should be sufficient to provide the desired conditioning benefits. Such concentration can vary with the conditioning agent, the conditioning performance desired, the average size of the conditioning agent particles, the type and concentration of other components, and other like factors.

Fabric Hueing Agents

The composition may comprise a fabric hueing agent (sometimes referred to as shading, bluing or whitening agents). Typically the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and provide the desired shade either alone or in combination. In another aspect, suitable small molecule dyes include small molecule dyes selected from the group consisting of Colour Index (Society of Dyers and Colourists, Bradford, UK)

numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes and mixtures thereof. In another aspect, suitable small molecule dyes include small molecule dyes selected from the group consisting of C. I. numbers Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof.

In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another aspect, suitable pigments include pigments selected from the group consisting of Ultramarine Blue (C.I. Pigment Blue 29), Ultramarine Violet (C.I. Pigment Violet 15) and mixtures thereof.

The aforementioned fabric hueing agents can be used in combination (any mixture of fabric hueing agents can be used).

Encapsulates

The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

In some aspects, the encapsulate comprises a core, and the core comprises a perfume. In certain aspects, the encapsulate comprises a shell, and the shell comprises melamine formaldehyde and/or cross linked melamine formaldehyde. In some aspects, the encapsulate comprises a core comprising a perfume and a shell comprising melamine formaldehyde and/or cross linked melamine formaldehyde Suitable encapsulates may comprise a core material and a shell, where the shell at least partially surrounds the core material. At least 75%, or at least 85%, or even at least 90% of the encapsulates may have a fracture strength of from about 0.2 MPa to about 10 MPa, from about 0.4 MPa to about 5 MPa, from about 0.6 MPa to about 3.5 MPa, or even from about 0.7 MPa to about 3 MPa; and a benefit agent leakage of from 0% to about 30%, from 0% to about 20%, or even from 0% to about 5%.

In some aspects, at least 75%, 85% or even 90% of said encapsulates may have a particle size of from about 1 microns to about 80 microns, about 5 microns to 60 microns, from about 10 microns to about 50 microns, or even from about 15 microns to about 40 microns.

In some aspects, at least 75%, 85% or even 90% of said encapsulates may have a particle wall thickness of from about 30 nm to about 250 nm, from about 80 nm to about 180 nm, or even from about 100 nm to about 160 nm.

In some aspects, the core of the encapsulate comprises a material selected from a perfume raw material and/or optionally a material selected from vegetable oil, including neat and/or blended vegetable oils including castor oil, coconut oil, cottonseed oil, grape oil, rapeseed, soybean oil, corn oil, palm oil, linseed oil, safflower oil, olive oil, peanut oil, coconut oil, palm kernel oil, castor oil, lemon oil and mixtures thereof; esters of vegetable oils, esters, including dibutyl adipate, dibutyl phthalate, butyl benzyl adipate, benzyl octyl adipate, tricresyl phosphate, trioctyl phosphate and mixtures thereof; straight or branched chain hydrocarbons, including those straight or branched chain hydrocarbons having a boiling point of greater than about 80° C.; partially hydrogenated terphenyls, dialkyl phthalates, alkyl biphenyls, including monoisopropylbiphenyl, alkylated naphthalene, including dipropylnaphthalene, petroleum spirits, including kerosene, mineral oil or mixtures thereof; aromatic solvents, including benzene, toluene or mixtures thereof; silicone oils; or mixtures thereof.

In some aspects, the wall of the encapsulate comprises a suitable resin, such as the reaction product of an aldehyde and an amine. Suitable aldehydes include formaldehyde. Suitable amines include melamine, urea, benzoguanamine, glycoluril, or mixtures thereof. Suitable melamines include methylol melamine, methylated methylol melamine, imino melamine and mixtures thereof. Suitable ureas include, dimethylol urea, methylated dimethylol urea, urea-resorcinol, or mixtures thereof.

In some aspects, suitable formaldehyde scavengers may be employed with the encapsulates, for example, in a capsule slurry and/or added to a composition before, during, or after the encapsulates are added to such composition.

In addition, the materials for making the aforementioned encapsulates can be obtained from Solutia Inc. (St Louis, Mo. U.S.A.), Cytec Industries (West Paterson, N.J. U.S.A.), sigma-Aldrich (St. Louis, Mo. U.S.A.), CP Kelco Corp. of San Diego, Calif., USA; BASF AG of Ludwigshafen, Germany; Rhodia Corp. of Cranbury, N.J., USA; Hercules Corp. of Wilmington, Del., USA; Agrium Inc. of Calgary, Alberta, Canada, ISP of New Jersey U.S.A., Akzo Nobel of Chicago, Ill., USA; Stroever Shellac Bremen of Bremen, Germany; Dow Chemical Company of Midland, Mich., USA; Bayer AG of Leverkusen, Germany; Sigma-Aldrich Corp., St. Louis, Mo., USA.

Perfumes

Perfumes and perfumery ingredients may be used in the cleaning compositions described herein. Non-limiting examples of perfume and perfumery ingredients include, but are not limited to, aldehydes, ketones, esters, and the like. Other examples include various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes can comprise extremely complex mixtures of such ingredients. Finished perfumes may be included at a concentration ranging from about 0.01% to about 2% by weight of the cleaning composition.

Dye Transfer Inhibiting Agents

Fabric cleaning compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents

The detergent compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins and mixtures thereof. Chelating agents can be present in the acid or salt form including alkali metal, ammonium, and substituted ammonium salts thereof, and mixtures thereof.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Phosphorus containing chelants include, but are not limited to diethylene triamine penta(methylene phosphonic acid) (DTPMP CAS 15827-60-8); ethylene diamine tetra (methylene phosphonic acid) (EDTMP CAS 1429-50-1); 2-Phosphonobutane 1,2,4-tricarboxylic acid (Bayhibit® AM); hexamethylene diamine tetra(methylene phosphonic acid) (CAS 56744-47-9); hydroxy-ethane diphosphonic acid (HEDP CAS 2809-21-4); hydroxyethane dimethylene phosphonic acid; 2-phosphono-1,2,4-Butanetricarboxylic acid (CAS 37971-36-1); 2-hydroxy-2-phosphono-Acetic acid (CAS 23783-26-8); Aminotri(methylenephosphonic acid) (ATMP CAS 6419-19-8); P,P'-(1,2-ethanediyl)bis-Phosphonic acid (CAS 6145-31-9); P,P'-methylenebis-Phosphonic acid (CAS 1984-15-2); Triethylenediaminetetra(methylene phosphonic acid) (CAS 28444-52-2); P-(1-hydroxy-1-methylethyl)-Phosphonic acid (CAS 4167-10-6); bis(hexamethylene triamine penta(methylenephosphonic acid)) (CAS 34690-00-1); N2,N2,N6,N6-tetrakis(phosphonomethyl)-Lysine (CAS 194933-56-7, CAS 172780-03-9), salts thereof, and mixtures thereof. Preferably, these aminophosphonates do not contain alkyl or alkenyl groups with more than about 6 carbon atoms.

A biodegradable chelator that may also be used herein is ethylenediamine disuccinate ("EDDS"). In some examples, but of course not limited to this particular example, the [S,S] isomer. In other examples, the trisodium salt of EDDA may be used, though other forms, such as magnesium salts, may also be useful. Polymeric chelants such as Trilon P® from BASF may also be useful.

Polyfunctionally-substituted aromatic chelating agents may also be used in the cleaning compositions. Compounds of this type in acid form are dihydroxydisulfobenzenes, such as 1,2-dihydroxy-3,5-disulfobenzene, also known as Tiron. Other sulphonated catechols may also be used. In addition to the disulfonic acid, the term "tiron" may also include mono- or di-sulfonate salts of the acid, such as, for example, the disodium sulfonate salt, which shares the same core molecular structure with the disulfonic acid.

The detergent composition according to the present invention may comprise a substituted or unsubstituted 2-pyridinol-N-oxide compound or a salt thereof, as a chelating agent. Included within the scope of this invention are tautomers of this compound, e.g., 1-Hydroxy-2(1H)-pyridinone, as chelating agents. In certain aspects, the detergent composition comprises a 2-pyridinol-N-oxide compound selected from the group consisting of: 2-hydroxypyridine-1-oxide; 3-pyridinecarboxylic acid, 2-hydroxy-, 1-oxide; 6-hydroxy-3-pyridinecarboxylic acid, 1-oxide; 2-hydroxy-4-pyridinecarboxylic acid, 1-oxide; 2-pyridinecarboxylic acid, 6-hydroxy-, 1-oxide; 6-hydroxy-3-pyridinesulfonic acid, 1-oxide; and mixtures thereof. In certain aspects, the detergent composition comprises a 1-Hydroxy-2(1H)-pyridinone compound selected from the group consisting of: 1-Hydroxy-2(1H)-pyridinone (CAS 822-89-9); 1,6-dihydro-1-hydroxy-6-oxo-3-Pyridinecarboxylic acid (CAS 677763-18-7); 1,2-dihydro-1-hydroxy-2-oxo-4-Pyridinecarboxylic acid (CAS 119736-22-0); 1,6-dihydro-1-hydroxy-6-oxo-2-Pyridinecarboxylic acid (CAS 94781-89-2); 1-hydroxy-4-methyl-6-(2,4,4-trimethylpentyl)-2(1H)-Pyridinone (CAS 50650-76-5); 6-(cyclohexylmethyl)-1-hydroxy-4-methyl-2(1H)-Pyridinone (CAS 29342-10-7); 1-hydroxy-4,6-dimethyl-2(1H)-Pyridinone (CAS 29342-02-7); 1-Hydroxy-4-methyl-6-(2,4,4-trimethylpentyl)-2-pyridone monoethanolamine (CAS 68890-66-4); 1-hydroxy-6-(octyloxy)-2(1H)-Pyridinone (CAS 162912-64-3); 1-Hydroxy-4-methyl-6-cyclohexyl-2-pyridinone ethanolamine salt (CAS 41621-49-2); 1-Hydroxy-4-methyl-6-cyclohexyl-2-pyridinone (CAS 29342-05-0); 6-ethoxy-1,2-dihydro-1-hydroxy-2-oxo-4-Pyridinecarboxylic acid, methyl ester (CAS 36979-78-9); 1-hydroxy-5-nitro-2(1H)-Pyridinone (CAS 45939-70-6); and mixtures thereof. These compounds are commercially available from, for example, Sigma-Aldrich (St. Louis, Mo.), Princeton Building Blocks (Monmouth Junction, N.J.), 3B Scientific Corporation (Libertyville, Ill.), SynFine Research (Richmond Hill, ON), Ryan Scientific, Inc. (Mt. Pleasant, S.C.), and/or Aces Pharma (Branford, Conn.).

Hydroxamic acids are a class of chemical compounds in which a hydroxylamine is inserted into a carboxylic acid and be used as chelating agents. The general structure of a hydroxamic acid is the following:

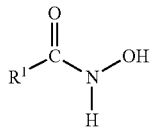

The preferred hydroxamates are those where $R^1$ is C4 to C14 alkyl, preferably normal alkyl, most preferably saturated, salts thereof and mixtures thereof. When the C8 material is used, it called octyl hydroxamic acid.

Other suitable chelating agents for use herein are the commercial DEQUEST® series, and chelants from Monsanto, Akzo-Nobel, DuPont, Dow, the Trilon® series from BASF and Nalco.

The chelant may be present in the detergent compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the detergent compositions disclosed herein.

Hygiene and Malodour

The compositions of the present invention may also comprise one or more of zinc ricinoleate, thymol, quaternary ammonium salts such as Bardac®, polyethylenimines (such as Lupasol® from BASF) and zinc complexes thereof, silver and silver compounds, especially those designed to slowly release $Ag^+$ or nano-silver dispersions.

Probiotics

The compositions may comprise probiotics such as those described in WO2009/043709.

Fillers and Carriers

Fillers and carriers may be used in the cleaning compositions described herein. As used herein, the terms "filler" and "carrier" have the same meaning and can be used interchangeably.

Liquid cleaning compositions and other forms of cleaning compositions that include a liquid component (such as liquid-containing unit dose cleaning compositions) may contain water and other solvents as fillers or carriers. Suitable solvents also include lipophilic fluids, including siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, and mixtures thereof.

Low molecular weight primary or secondary alcohols exemplified by methanol, ethanol, propanol, and isopropanol are suitable. Monohydric alcohols may be used in some examples for solubilizing surfactants, and polyols such as those containing from 2 to about 6 carbon atoms and from 2 to about 6 hydroxy groups (e.g., 1,3-propanediol, ethylene glycol, glycerine, and 1,2-propanediol) may also be used. Amine-containing solvents, such as monoethanolamine, diethanolamine and triethanolamine, may also be used.

The cleaning compositions may contain from about 5% to about 90%, and in some examples, from about 10% to about 50%, by weight of the composition, of such carriers. For compact or super-compact heavy duty liquid or other forms of cleaning compositions, the use of water may be lower than about 40% by weight of the composition, or lower than about 20%, or lower than about 5%, or less than about 4% free water, or less than about 3% free water, or less than about 2% free water, or substantially free of free water (i.e., anhydrous).

For powder or bar cleaning compositions, or forms that include a solid or powder component (such as powder-containing unit dose cleaning composition), suitable fillers may include, but are not limited to, sodium sulfate, sodium chloride, clay, or other inert solid ingredients. Fillers may also include biomass or decolorized biomass. Fillers in granular, bar, or other solid cleaning compositions may comprise less than about 80% by weight of the cleaning composition, and in some examples, less than about 50% by weight of the cleaning composition. Compact or supercompact powder or solid cleaning compositions may comprise less than about 40% filler by weight of the cleaning composition, or less than about 20%, or less than about 10%.

For either compacted or supercompacted liquid or powder cleaning compositions, or other forms, the level of liquid or solid filler in the product may be reduced, such that either the same amount of active chemistry is delivered to the wash liquor as compared to noncompacted cleaning compositions, or in some examples, the cleaning composition is more efficient such that less active chemistry is delivered to the wash liquor as compared to noncompacted compositions.

For example, the wash liquor may be formed by contacting the cleaning composition to water in such an amount so that the concentration of cleaning composition in the wash liquor is from above 0 g/l to 6 g/l. In some examples, the concentration may be from about 0.5 g/l to about 5 g/l, or to about 3.0 g/l, or to about 2.5 g/l, or to about 2.0 g/l, or to about 1.5 g/l, or from about 0 g/l to about 1.0 g/l, or from about 0 g/l to about 0.5 g/l. These dosages are not intended to be limiting, and other dosages may be used that will be apparent to those of ordinary skill in the art.

Buffer System

The cleaning compositions described herein may be formulated such that, during use in aqueous cleaning operations, the wash water will have a pH of between about 7.0 and about 12, and in some examples, between about 7.0 and about 11. Techniques for controlling pH at recommended usage levels include the use of buffers, alkalis, or acids, and are well known to those skilled in the art. These include, but are not limited to, the use of sodium carbonate, citric acid or sodium citrate, lactic acid or lactate, monoethanol amine or other amines, boric acid or borates, and other pH-adjusting compounds well known in the art.

The cleaning compositions herein may comprise dynamic in-wash pH profiles. Such cleaning compositions may use wax-covered citric acid particles in conjunction with other pH control agents such that (i) about 3 minutes after contact with water, the pH of the wash liquor is greater than 10; (ii) about 10 minutes after contact with water, the pH of the wash liquor is less than 9.5; (iii) about 20 minutes after contact with water, the pH of the wash liquor is less than 9.0; and (iv) optionally, wherein, the equilibrium pH of the wash liquor is in the range of from about 7.0 to about 8.5.

UV Absorbers—in certain consumer product embodiments of the present invention, the photo-responsive encapsulates of the present invention may be stabilized against premature release by exposure to light of a sufficient wavelength during storage by incorporation of a suitable UV-absorbing ingredients into the composition. Any suitable UV-absorbing composition may be employed, but particularly preferred are those which do not impart an unpleasant color or odor to the composition, and which do not adversely affect the rheology of the product. Non-limiting examples of UV-absorbing ingredients include avobenzone, cinoxate, ecamsule, menthyl anthranilate, octyl methoxycinnamate, octyl salicylate, oxybenzone, sulisobenzone, and combinations thereof. Applicants have surprisingly found that the use of such UV-absorbing ingredients do not compromise the light-activated performance of encapsulates of the present invention. Without wishing to be bound by theory, it is believed that in many consumer product applications, e.g., cleaning compositions including laundry detergents, shampoos and body washes, the UV absorbing ingredient is washed down the drain while the encapsulates of the present invention are retained in an efficacious amount on the surface of interest where they are available to release their contents on subsequent exposure to light of a sufficient wavelength. In other cleaning compositions or leave-on consumer products, e.g., floor cleaning compositions, drapery and upholstery refreshers, body lotions, and hair styling products, it is believed that the UV-absorbing ingredients dry down to a thin film after application, allowing the encapsulates of the present invention to sit atop or extend above the film. This allows and efficacious amount of light of the desired wavelength to reach the encapsulates and effect the release of the benefit agents.

Test Methods

LCAF Solubility Index Method:

Measuring the Miscibility of Materials in Organocompatible Silicones Via UV-Vis % Transmittance.

The Solubility Index is determined by measuring the percentage of light transmittance through samples using a UV-Vis Spectrophotometer operated in transmission mode, at 480 nm, using 1 cm path length cuvettes, in accordance with the following procedure. Suitable instruments include the Beckman Coulter model DU 800 UV-Vis Spectrophotometer (Beckman Coulter Inc., Brea, Calif., USA).

All sample preparations and analyses are conducted in a laboratory with air temperature of 22° C.+/−2° C. In a glass scintillation vial combine the predominant organocompatible silicone present in the composition, along with the material to be tested (for example, a polydimethyl siloxane polymer), at the ratio of 80:20 vol/vol. Cap the vial, and mix the materials thoroughly for 5 minutes using a benchtop vortex mixer set to its highest speed. If two or more distinct layers of materials are clearly visible by eye in the vial after mixing, then the Solubility Index of the test material is considered to be indeterminate via this method. If distinct layers are not clearly visible by eye, then continue with the analysis.

Turn on the spectrophotometer lamps and allow them to warm up for 30 minutes prior to commencing measurements. Set the instrument to collect the measurement in Percentage Transmission (% T) mode, at a wavelength of 480 nm. Load all samples into 1 cm path length plastic cuvettes. If air bubbles are visible in the cuvettes, use a pipette to remove the bubbles, or let the bubbles settle out of the cuvette prior to measurement.

Zero the baseline for a neat sample of the organocompatible silicone by using a cuvette loaded with deionized (DI) water along with a cuvette loaded with the neat silicone. Measure the % T of the neat organocompatible silicone. Measure the % T of the mixture of organocompatible silicone and test sample, as prepared under the previous instructions. Compare the % T of the mixture of organocompatible silicone and test sample, to the % T of the neat organomodified silicone (which was measured using a DI water blank as a baseline).

The Solubility Index is reported as a decimal number, and is calculated as the % T of the mixture of organocompatible silicone and test sample, divided by the % T of the neat organocompatible silicone. Example; Solubility Index of Test Sample ABC:

=% T of ABC in Organocompatible Silicone/% T of the Organocompatible Silicone

=85%/98%

=0.867

Viscosity Test Method

Equipment: Brookfield Viscometer and AR G2 Rheometer manufactured by TA Instruments Brookfield Viscometer is used to get the approximate range of the test material so that the best geometry for the AR G2 Rheometer can be selected.

AR G2 Rheometer Protocol
1. Geometry selection
    a. Type
        i. Parallel plate
        ii. Couette/Cup & bob
    b. Size of plate

| Sample Viscosity (1 Pa*s = 1000 cP) | Plate Size |
|---|---|
| >1000 Pa*s | 25 mm |
| 1-1000 Pa*s | 40 mm |
| <1 Pa*s | 60 mm |
| Water-thin | Couette |

2. Attach geometry
3. Zero gap
4. Set measurement mode. Select stiff mode or soft mode (for very low viscosity)
5. Instrument rotational mapping (repeat before every experiment)
6. Sample loading
    a. Place sample on base plate
    b. Enter gap
        i. 1000 um (1 mm) is standard
        ii. Minimum gap=10× largest particle size in sample
    c. Lock bearing
    d. Use plastic slide to trim sample
7. Run a measurement
8. Sample procedures
    a. Flow Curve (stepped flow, 0.01-100; 10 pts/decade, shear stress, constant time 20, average last 10)
    b. Stress Sweep (Stress=0.01-100 Pa, frequency=1 rad/s)
    c. Frequency Sweep (angular frequency=0.1 to 100; set stress @⅓ of stress where G' started to degrade in stress sweep to ensure that you are in Linear Viscoelastic Region)

EXAMPLES

Example 1

Silicone Antifoam Agent A1

Silicone antifoam agent A1 is prepared by charging a 250 ml container equipped with a stirrer with 71.14 g of a polymer having a molecular weight of approximately 65,000 and comprising 71-75 mole % dimethylsiloxane groups, 20-24 mole % 2-phenylpropylmethylsiloxane groups, 3-7 mole % octylmethylsiloxane groups and terminated with a trimethylsilyl group[1], and 3.8 g of an organosiloxane resin[2] having trimethyl siloxane units and $SiO_2$ units in a M/Q ratio of about 0.65/1 to 0.67/1 dissolved in 20.06 g of 10 cSt. polydimethylsiloxane[3]. The mixture is stiffed until complete incorporation of the resin mixture. Then 5.00 g of precipitated silica[5] and is added and the mixture stirred until complete incorporation of the silica is achieved.

[1] Supplied by Shin-Etsu Silicones of America, Akron, Ohio
[2] Supplied by Wacker Silicones, Adrian, Mich. under the trade name Belsil® 803
[3] Supplied by Shin-Etsu Silicones of America, Akron, Ohio
[5] Available from Evonik Degussa Corporation, Parsippany, N.J.

Example 2

Silicone Antifoam Agent B1

Silicone antifoam agent B1 is prepared by charging a 250 ml container equipped with a stirrer with 69.05 g of a polymer having a molecular weight of approximately 65,000 and comprising 71-75 mole % dimethylsiloxane groups, 20-24 mole % 2-phenylpropylmethylsiloxane groups, 3-7 mole % octylmethylsiloxane groups and terminated with a trimethylsilyl group[1], and 2.25 g of an organosiloxane resin[2] having trimethyl siloxane units and $SiO_2$ units in a M/Q ratio of about 0.65/1 to 0.67/1 dissolved in 23.70 g of 10 cSt. polydimethylsiloxane[3]. The mixture is stirred until complete incorporation of the resin mixture. Then 5.00 g of precipitated silica[5] and is added and the mixture stirred until complete incorporation of the silica is achieved.

Example 3

Silicone Antifoam Agent C1

Silicone antifoam agent C1 is prepared by charging a 250 ml container equipped with a stirrer with 67.68 g of a polymer having a molecular weight of approximately 65,000 and comprising 71-75 mole % dimethylsiloxane groups, 20-24 mole % 2-phenylpropylmethylsiloxane groups, 3-7 mole % octylmethylsiloxane groups and terminated with a trimethylsilyl group[1], and 2.25 g of an organosiloxane resin[2] having trimethyl siloxane units and $SiO_2$ units in a M/Q ratio of about 0.65/1 to 0.67/1 dissolved in 22.55 g of 10 cSt. polydimethylsiloxane[3]. The mixture is stirred until complete incorporation of the resin mixture. Then 7.52 g of precipitated silica[5] and is added and the mixture stirred until complete incorporation of the silica is achieved.

Example 4

Silicone Antifoam Agent D1

Silicone antifoam agent D1 is prepared by charging a 250 ml container equipped with a stirrer with 70.56 g of a polymer having a molecular weight of approximately 65,000 and comprising 71-75 mole % dimethylsiloxane groups, 20-24 mole % 2-phenylpropylmethylsiloxane groups, 3-7 mole % octylmethylsiloxane groups and terminated with a trimethylsilyl group[1], 3.80 g of an organosiloxane resin[2] having trimethyl siloxane units and $SiO_2$ units in a M/Q ratio of about 0.65/1 to 0.67/1 dissolved in 3.00 g of 2-ethylhexyl stearate[4] and 17.64 g of 10 cSt. polydimethylsiloxane[3]. The mixture is stirred until complete incorporation of the resin mixture. Then 5.00 g of precipitated silica[5] is added and the mixture stirred until complete incorporation of the silica is achieved.

[4] Supplied by Wako Chemicals USA, Inc, Richmond, Va.

Example 5

Silicone Antifoam Agent E1

Silicone antifoam agent E1 is prepared by charging a 250 ml container equipped with a stirrer with 67.68 g of a polymer having a molecular weight of approximately 65,000 and comprising 71-75 mole % dimethylsiloxane groups, 20-24 mole % 2-phenylpropylmethylsiloxane groups, 3-7 mole % octylmethylsiloxane groups and terminated with a trimethylsilyl group[1], and 2.25 g of an organosiloxane resin[2] having trimethyl siloxane units and $SiO_2$ units in a M/Q ratio of about 0.65/1 to 0.67/1 dissolved in 22.55 g of 10 cSt. polydimethylsiloxane[3]. The mixture is stirred until complete incorporation of the resin mixture. Then 5.00 g of precipitated silica[5] and 2.52 g fumed silica[6] is added and the mixture stirred until complete incorporation of the silica is achieved.

[6] Available from Evonik Degussa Corporation, Parsippany, N.J.

Example 6

Silicone Antifoam Agent F1

Silicone antifoam agent F1 is prepared by charging a 250 ml container equipped with a stirrer with 42.70 g of a polymer having a molecular weight of approximately 65,000 and comprising 71-75 mole % dimethylsiloxane groups, 20-24 mole % 2-phenylpropylmethylsiloxane groups, 3-7 mole % octylmethylsiloxane groups and terminated with a trimethylsilyl group[1], 2.40 g of an organosiloxane resin[2] having trimethyl siloxane units and $SiO_2$ units in a M/Q ratio of about 0.65/1 to 0.67/1 dissolved in 2.40 g of 2-ethylhexyl stearate[4], 28.50 g of 10 cSt. polydimethylsiloxane[3] and 20.00 g of 7 cSt. polydimethylsiloxane[7]. The mixture is stirred until complete incorporation of the resin mixture. Then 4.00 g of precipitated silica[5] is added and the mixture stirred until complete incorporation of the silica is achieved.

[7] Available from Gelest, Inc., Morrisville, Pa.

Example 7

Silicone Antifoam Agent G1

Silicone antifoam agent G1 is prepared by charging a 250 ml container equipped with a stirrer with 65.52 g of a polymer having a molecular weight of approximately 65,000 and comprising 71-75 mole % dimethylsiloxane groups, 20-24 mole % 2-phenylpropylmethylsiloxane groups, 3-7 mole % octylmethylsiloxane groups and terminated with a trimethylsilyl group[1] and 6.0 g of an organosiloxane resin[2] having trimethyl siloxane units and $SiO_2$ units in a M/Q ratio of about 0.65/1 to 0.67/1. The mixture is stirred until complete incorporation of the resin. Then 5.25 g of Sipernat 35 precipitated silica[5] and 1.75 g of Aerosil 200 fumed silica[5] is added and the mixture stirred until complete incorporation of the silica is achieved. Then 0.79 g of potassium methoxide is added and the mixture is stirred for 4 hours at 200° C., cooled to ambient and 18.48 g of 10 cSt. polydimethylsiloxane[3] and 3.00 g of 2-ethylhexylstearate is added and stirred until complete incorporation is achieved, yielding a viscous semi-transparent liquid.

Example 8

Silicone Antifoam Agent H1

Silicone antifoam agent H1 is prepared by charging a 250 ml container equipped with a stirrer with 70.56 g of a polymer having a molecular weight of approximately 65,000 and comprising 71-75 mole % dimethylsiloxane groups, 27-33 mole % 2-phenylpropylmethylsiloxane groups, 3-7 mole % octylmethylsiloxane groups and terminated with a trimethylsilyl group[1]. 3.80 g of an organosiloxane resin[2] having trimethyl siloxane units and $SiO_2$ units in a M/Q ratio of about 0.65/1 to 0.67/1 dissolved in 3.00 g of 2-ethylhexyl stearate[4] and 17.64 g of 10 cSt. polydimethylsiloxane[3]. The mixture is stirred until complete incorporation of the resin mixture. Then 5.00 g of precipitated silica[5] is added and the mixture stirred until complete incorporation of the silica is achieved.

Example 9: Liquid Detergent Fabric Care Compositions

Liquid detergent fabric care compositions 9A-9E are made by mixing together the ingredients listed in the proportions shown:

| Ingredient (wt %) | 9A | 9B | 9C | 9D | 9E |
|---|---|---|---|---|---|
| $C_{12}$-$C_{15}$ alkyl polyethoxylate (1.8) sulfate[1] | 20.1 | 16.6 | 14.7 | 13.9 | 8.2 |
| $C_{11.8}$ linear alkylbenzene sulfonic acid[2] | — | 4.9 | 4.3 | 4.1 | 8.2 |
| $C_{16}$-$C_{17}$ branched alkyl sulfate[1] | — | 2.0 | 1.8 | 1.6 | — |
| $C_{12}$ alkyl trimethyl ammonium chloride[4] | 2.0 | — | — | — | — |
| $C_{12}$ alkyl dimethyl amine oxide[5] | — | 0.7 | 0.6 | — | — |
| $C_{12}$-$C_{14}$ alcohol 9 ethoxylate[3] | 0.3 | 0.8 | 0.9 | 0.6 | 0.7 |
| $C_{15}$-$C_{16}$ branched alcohol -7 ethoxylate[1] | — | — | — | — | 4.6 |
| 1,2 Propane diol[6] | 4.5 | 4.0 | 3.9 | 3.1 | 2.3 |
| Ethanol | 3.4 | 2.3 | 2.0 | 1.9 | 1.2 |
| $C_{12}$-$C_{18}$ Fatty Acid[5] | 2.1 | 1.7 | 1.5 | 1.4 | 3.2 |
| Citric acid[7] | 3.4 | 3.2 | 3.5 | 2.7 | 3.9 |
| Protease[7] (32 g/L) | 0.42 | 1.3 | 0.07 | 0.5 | 1.12 |
| Fluorescent Whitening Agent[8] | 0.08 | 0.2 | 0.2 | 0.17 | 0.18 |
| Diethylenetriamine pentaacetic acid[6] | 0.5 | 0.3 | 0.3 | 0.3 | 0.2 |
| Ethoxylated polyamine[9] | 0.7 | 1.8 | 1.5 | 2.0 | 1.9 |
| Grease Cleaning Alkoxylated Polyalkylenimine Polymer[10] | — | — | 1.3 | 1.8 | — |
| Zwitterionic ethoxylated quaternized sulfated hexamethylene diamine[11] | — | 1.5 | — | — | 0.8 |
| Hydrogenated castor oil[12] | 0.2 | 0.2 | — | 0.12 | 0.3 |
| Copolymer of acrylamide and methacrylamidopropyl trimethylammonium chloride[13] | 0.3 | 0.2 | 0.3 | 0.1 | 0.3 |
| Antifoam of any of Examples 1-8 (mixtures thereof may also be used) | 0.2 | 0.1 | 0.2 | 0.2 | 0.2 |
| Water, perfumes, dyes, buffers, solvents and other optional components | to 100% pH 8.0-8.2 | to 100% pH 8.0-8.2 | to 100% pH 8.0-8.2 | to 100% pH 8.0-8.2 | to 100% pH 8.0-8.2 |

Example 10: Liquid or Gel Detergents

Liquid or gel detergent fabric care compositions 10A-10E are prepared by mixing the ingredients listed in the proportions shown:

| Ingredient (wt %) | 10A | 10B | 10C | 10D | 10E | 10F | 10G |
|---|---|---|---|---|---|---|---|
| $C_{12}$-$C_{15}$ alkyl polyethoxylate (3.0) sulfate[1] | 8.5 | 2.9 | 2.9 | 2.9 | 6.8 | 9.1 | 9.1 |
| $C_{11.8}$ linear alkylbenzene sulfonic acid[2] | 11.4 | 8.2 | 8.2 | 8.2 | 1.2 | 5.7 | 5.7 |
| $C_{14}$-$C_{15}$ alkyl 7-ethoxylate[1] | — | 5.4 | 5.4 | 5.4 | 3.0 | | |
| $C_{12}$-$C_{14}$ alkyl 7-ethoxylate[3] | 7.6 | — | — | — | 1.0 | 0.2 | 0.2 |

-continued

| Ingredient (wt %) | 10A | 10B | 10C | 10D | 10E | 10F | 10G |
|---|---|---|---|---|---|---|---|
| $C_{12}$ alkyl dimethyl amine oxide[5] | | | | | | 0.6 | 0.6 |
| 1,2 Propane diol | 6.0 | 1.3 | 1.3 | 6.0 | 0.2 | 0.8 | 0.8 |
| Ethanol | — | 1.3 | 1.3 | — | 1.4 | 0.7 | 0.7 |
| Di Ethylene Glycol | 4.0 | — | — | — | — | | |
| Na Cumene Sulfonate | — | 1.0 | 1.0 | 0.9 | — | 1.1 | 3.1 |
| $C_{12}$-$C_{18}$ Fatty Acid[5] | 9.5 | 3.5 | 3.5 | 3.5 | 4.5 | 0.7 | 0.7 |
| Citric acid | 2.8 | 3.4 | 3.4 | 3.4 | 2.4 | 2.1 | 2.1 |
| Protease (40.6 mg/g/)[7] | 1.0 | 0.6 | 0.6 | 0.6 | 0.3 | | |
| Protease (54.5 mg/g/)[7] | | | | | | 0.3 | 0.3 |
| Natalase 200L (29.26 mg/g)[14] | — | 0.1 | 0.1 | 0.1 | — | | |
| Termamyl Ultra (25.1 mg/g)[14] | 0.7 | 0.1 | 0.1 | 0.1 | 0.1 | 0.1 | 0.1 |
| Mannaway 25L (25 mg/g)[14] | 0.1 | 0.1 | 0.1 | 0.1 | 0.02 | | |
| Whitezyme (20 mg/g)[14] | 0.2 | 0.1 | 0.1 | 0.1 | — | | |
| Fluorescent Whitening Agent[8] | 0.2 | 0.1 | 0.1 | 0.1 | — | 0.04 | 0.04 |
| Diethylene Triamine Penta Methylene Phosphonic acid | — | 0.3 | 0.3 | 0.3 | 0.1 | | |
| Diethylenetriamine pentaacetic acid[6] | | | | | | 0.4 | 0.4 |
| Hydroxy Ethylidene 1,1 Di Phosphonic acid | 1.5 | — | — | — | — | | |
| Zwitterionic ethoxylated quaternized sulfated hexamethylene diamine[11] | 2.1 | 1.0 | 1.0 | 1.0 | 0.7 | | |
| Grease Cleaning Alkoxylated Polyalkylenimine Polymer[10] | — | 0.4 | 0.4 | 0.4 | — | | 1.5 |
| Ethoxylated polyamine[9] | | | | | | 2.2 | |
| PEG-PVAc Polymer[15] | 0.9 | 0.5 | 0.5 | 0.5 | — | | |
| Hydrogenated castor oil[12] | 0.8 | 0.4 | 0.4 | 0.4 | 0.3 | 0.15 | 0.15 |
| Borate | — | 1.3 | — | — | 1.2 | 1.1 | 1.1 |
| 4 Formyl Phenyl Boronic Acid | — | — | 0.025 | — | — | | |
| Antifoam of any of the Examples 1-8. | 0.4 | 0.3 | 0.3 | 0.2 | 0.3 | 0.15 | 0.15 |
| Tinosan ® HP 100 via BASF | | | | | | 0.05 | 0.05 |
| Water, solvents, perfumes, dyes, buffers, neutralizers, stabilizers and other optional components | to 100% pH 8.0-8.2 | to 100% pH 8.0-8.2 | to 100% pH 8.0-8.2 | to 100% pH 8.0-8.2 | to 100% pH 8.0-8.2 | to 100% pH 8.0-8.5 | to 100% pH 8.0-8.5 |

[1]Available from Shell Chemicals, Houston, TX.
[2]Available from Huntsman Chemicals, Salt Lake City, UT.
[3]Available from Sasol Chemicals, Johannesburg, South Africa
[4]Available from Evonik Corporation, Hopewell, VA.
[5]Available from The Procter & Gamble Company, Cinncinnati, OH.
[6]Available from Sigma Aldrich chemicals, Milwaukee, WI
[7]Available from Genencor International, San Francisco, CA.
[8]Available from Ciba Specialty Chemicals, High Point, NC
[9]600 g/mol molecular weight polyethylenimine core with 20 ethoxylate groups per —NH and available from BASF (Ludwigshafen, Germany)
[10]600 g/mol molecular weight polyethylenimine core with 24 ethoxylate groups per —NH and 16 propoxylate groups per —NH. Available from BASF (Ludwigshafen, Germany).
[11]Described in WO 01/05874 and available from BASF (Lugwigshafen, Germany)
[12]Available under the trade name Thixin ® R from Elementis Specialties, Hightown, NJ
[13]Available from Nalco Chemicals, Naperville, IL.
[14]Available from Novozymes, Copenhagen, Denmark.
[15]PEG-PVA graft copolymer is a polyvinyl acetate grafted polyethylene oxide copolymer

Example 11: Rinse-Added Fabric Care Compositions

Rinse-Added fabric care compositions 11A-11 D are prepared by mixing together ingredients shown below:

| Ingredient | 11A | 11B | 11C | 11D |
|---|---|---|---|---|
| Fabric Softener Active[1] | 16.2 | 11.0 | 16.2 | — |
| Fabric Softener Active[2] | — | — | — | 5.0 |
| Cationic Starch[3] | 1.5 | — | 1.5 | — |
| Polyethylene imine[4] | 0.25 | 0.25 | — | — |
| Quaternized polyacrylamide[5] | — | — | 0.25 | 0.25 |
| Calcium chloride | 0.15 | 0. | 0.15 | — |
| Ammonium chloride | 0.1 | 0.1 | 0.1 | — |
| Antifoam of any of the Examples 1-8 | 0.1 | 0.1 | 0.1 | 0.1 |
| Perfume | 0.85 | 2.0 | 0.85 | 1.0 |
| Perfume microcapsule[6] | 0.65 | 0.75 | 0.65 | 0.3 |
| Water, suds suppressor, stabilizers, pH control agents, buffers, dyes & other optional ingredients | to 100% pH = 3.0 | to 100% pH = 3.0 | to 100% pH = 3.0 | to 100% pH = 3.0 |

[1]N,Ndi(tallowoyloxyethyl)-N,Ndimethylammonium chloride available from Evonik Corporation, Hopewell, VA.
[2]Reaction product of fatty acid with Methyldiethanolamino, quaternized with Methylchloride, resulting in a 2.5:1 molar mixture of N,N-di(tallowoyloxyethyl)N,N-dimethylammonium chloride and N-(tallowoyloxyethyl) N-hydroxyethyl N,N-dimethylammonium chloride available from Evonik Corporation, Hopewell, VA.
[3]Cationic starch based on common maize starch or potato starch, containing 25% to 95% amylose and a degree of substitution of from 0.02 to 0.09, and having a viscosity measured as Water Fluidity having a value from 50 to 84. Available from National Starch, Bridgewater, NJ.

-continued

| Ingredient | 11A | 11B | 11C | 11D |
|---|---|---|---|---|

[4] Available from Nippon Shokubai Company, Tokyo, Japan under the trade name Epomin ® 1050.
[5] Cationic polyacrylamide polymer such as copolymer of acrylamide-co-[2-(acryloylamino)ethyl]tri-methylammonium chloride(quaternized dimethyl aminoethyl acrylate) available from BASF, AG, Ludwigshafen under the trade name Sedipur ® 544.
[6] Available from Appleton Paper of Appleton, WI Example 12: Powder Detergent Compositions

| Ingredient | 12A wt % | 12b wt % | 12c wt % |
|---|---|---|---|
| LAS (Non-sulphated anionic surfactant) | 10 | 15-16 | 7 |
| Mixture of alkyl sulphate surfactants | 1.5 | 1.5-2 | 1.5 |
| Cationic surfactant | 0-1 | 0-1.5 | 0-1 |
| Non ionic surfactant | 0-1 | 0-1.5 | 0-1 |
| Zeolite | 0-3 | 6-10 | 0-3 |
| Polymeric dispersing or soil release agents | 1-3 | 1-4 | 1-3 |
| Bleach and bleach activator | 0-5 | 4-6 | 2-3 |
| Silicate | 7-9 | — | 5-6 |
| Carbonate | 10-30 | 25-35 | 15-30 |
| Sulfate | 30-70 | 30-35 | 40-70 |
| Antifoam of any of the Examples 1-8 | 0-1.5 | 0-1.5 | 0-1.5 |
| Deionized water | Balance to 100 wt % | | |

The dimensions and values disclosed herein are not to be understood as being strictly limited to the exact numerical values recited. Instead, unless otherwise specified, each such dimension is intended to mean both the recited value and functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising an adjunct ingredient and an antifoam, said antifoam comprising:
   a) an organomodified silicone comprising one or more 2-phenylpropylmethyl moieties;
   b) silica;
   c) a siloxane polymer, said siloxane polymer having a solubility index of greater than about 0.8, and a viscosity of from about 0.5 cSt to about 10,000 cSt; said siloxane polymer having a viscosity that is about 5%, less than that of said organomodified silicone; and
   d) a silicone resin;
   said antifoam composition having a viscosity, at a shear rate of 20 sec$^{-1}$ at 25° C., of from about 250 cSt to about 20,000 cSt;
   said composition being a fabric and home care product.

2. The composition according to claim 1, wherein said antifoam's siloxane polymer comprises a polydimethyl siloxane polymer having a viscosity of from about 0.5 cSt to about 1,000 cSt.

3. The composition of claim 1, wherein said antifoam has a ratio of siloxane polymer to organomodified silicone of from 1:4 to 4:1.

4. The composition of claim 1, wherein said antifoam's organomodified silicone comprises units of the following formula(I):

$$R_a(R^1O)_bR^2_cSiO_{(4-a-b-c)/2} \quad \text{Formula (I)}$$

wherein:
a) each R is independently selected from: H, an aromatic hydrocarbon radical covalently attached to silicon via aliphatic groups, or a monovalent, SiC-bonded, optionally substituted, aliphatic hydrocarbon radical that optionally comprises a heteroatom;
b) each $R^1$ is independently selected from: H, or a monovalent, optionally substituted aliphatic hydrocarbon radical, that optionally comprises a heteroatom;
c) each $R^2$ is independently selected from the group consisting of H, an aromatic hydrocarbon radical covalently attached to silicon via aliphatic groups, a monovalent, optionally substituted, aromatic hydrocarbon radical which is attached to the silicon atom via a carbon ring atom and a monovalent, SiC-bonded, optionally substituted, aliphatic hydrocarbon radical that optionally comprises a heteroatom;
d) the index a is 0, 1, 2 or 3;
e) the index b is 0, 1, 2 or 3;
f) the index c is 0, 1, 2 or 3;
with the proviso that the sum of a+b+c is an integer from 0 to 3.

5. The composition of claim 1, wherein said anti-foam's silica comprises hydrophobic, precipitated silica and/or hydrophobic, fumed silica.

6. The composition of claim 1, wherein said anti-foam's siloxane polymer has a viscosity of from about 0.5 cSt to about 19 cSt, preferably, said siloxane polymer comprises polydimethylsiloxane.

7. The composition of claim 1, wherein said anti-foam's silicone resin comprises units of formula (II) below:

$$R^3_d(R^4O)_eSiO_{(4-d-e)/2} \quad \text{Formula (II)}$$

wherein:
a) each $R^3$ is independently selected from H, a monovalent, SiC-bonded, optionally substituted, aliphatic hydrocarbon radical that optionally comprises a heteroatom, or an aromatic hydrocarbon radical covalently attached to silicon via aliphatic groups;
b) each $R^4$ is independently selected from H, or a monovalent, optionally substituted aliphatic hydrocarbon radical, that optionally comprises a heteroatom;
c) the index d is 0, 1, 2 or 3; and
d) the index e is 0, 1, 2 or 3;
with the proviso that the sum of d+e is an integer from 0 to 3.

8. The composition according to claim 1 wherein, based upon total composition weight, said anti-foam comprises
a. 50-75% organomodified silicone;
b. 1.5-4.0% silicone resin;
c. 15-40% of siloxane polymer;
d. 4-8% silica; and
e. 0-4% solvent.

9. The composition according to claim 1 wherein the anti-foam's ratio of organomodified silicone to silica is from about 8:1 to about 15:1.

10. The composition according to claim 1 wherein, based upon total antifoam composition weight, said antifoam comprises
   a. about 35% to about 75%, of an organomodified silicone;
   b. from about 1.5 to about 4.0% silicone resin;
   c. from about 2% to about 8% of a silica that comprises hydrophobized silica;
   d. from 0% to about 10% solvent; and
   e. from 20% to about 30%, siloxane polymer based on the weight of said organomodified silicone; or from about 45% to about 60%, siloxane polymer based on the weight of said organomodified silicone.

11. The composition according to claim 1, wherein said antifoam is in a solid form, preferably in a form selected from the group consisting of a powder, an agglomerate, and mixtures thereof.

12. The composition according to claim 1 wherein the adjunct ingredient is selected from the group consisting of surfactants, color care polymers, deposition aids, surfactant boosting polymers, pH adjusters, product color stabilizers, preservatives, solvents, builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, UV absorbers, perfume and perfume delivery systems, structure elasticizing agents, thickeners/structurants, fabric softeners, carriers, hydrotropes, oligoamines, processing aids, hueing agents, and/or pigments.

13. A composition according to claim 12 comprising a surfactant is selected from the group consisting of anionic surfactant, cationic surfactant, nonionic surfactant, zwitterionic surfactant, ampholytic surfactant and mixtures thereof.

14. A composition according to claim 13 comprising an anionic surfactant.

15. A composition according to claim 14 wherein said anionic surfactant is selected from the group consisting of a $C_9$-$C_{18}$ alkyl benzene sulfonate surfactant; a $C_{10}$-$C_{20}$ alkyl sulfate surfactant; a $C_{10}$-$C_{18}$ alkyl alkoxy sulfate surfactant, said $C_{10}$-$C_{18}$ alkyl alkoxy sulfate surfactant having an average degree of alkoxylation of from 1 to 30 and the alkoxy comprises a $C_1$-$C_4$ chain, and mixtures thereof.

16. A composition according to claim 12 wherein:
   a. said fabric softener active is selected from the group consisting of polyglycerol esters, oily sugar derivatives, wax emulsions, fatty acids, N, N-bis(stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxy-ethyl)N-methyl ammonium methylsulfate and mixtures thereof;
   b. said deposition aid polymer comprises a cationic polymer having a cationic charge of from about 0.005 meq/g to about 23 meq/g, preferably of from about 0.01 meq/g to about 12 meq/g, most preferably of from about 0.1 meq/g to about 7 meq/g at the pH of said composition;
   c. said perfume delivery system comprises components selected from the group consisting of a perfume microcapsule, or a moisture-activated perfume microcapsule, wherein the microcapsule comprises a shell comprising a polyacrylate and/or a polymer crosslinked with an aldehyde, preferably said shell comprises a polymer selected from the group consisting of a polyacrylate, polyurea, polyurethane, polyamine, urea crosslinked with an aldehyde, or melamine crosslinked with an aldehyde, more preferably said polymer is selected from the group consisting of melamine-formaldehyde, urea-formaldehyde, phenol-formaldehyde, or other condensation polymers with formaldehyde, a perfume carrier and an encapsulated perfume composition, wherein said perfume carrier may be selected from the group consisting of cyclodextrins, starch microcapsules, porous carrier microcapsules, and mixtures thereof; and wherein said encapsulated perfume composition may comprise low volatile perfume ingredients, high volatile perfume ingredients, and mixtures thereof;
   d. said enzyme is selected from the group consisting of protease, amylase, lipase, mannanase, cellulase, xyloglucanase, pectate lyase, and mixtures thereof;
   e. said structurant is selected from the group consisting of hydrogenated castor oil; derivatives of hydrogenated castor oil; microfibrillar cellulose; hydroxyfunctional crystalline materials, long-chain fatty alcohols, 12-hydroxystearic acid; clays; and mixtures thereof;
   f. said polymeric dispersing agent is selected from the group consisting of polycarboxylates, soil release polymers, carboxymethylcelluloses, poly(vinyl-pyrrolidone), poly (ethylene glycol), poly(vinyl alcohol), poly (vinylpyridine-N-oxide), poly(vinylimidazole), zwitterionic ethoxylated quaternized sulfated hexamethylene diamine, alkoxylated polyalkylenimine, ethoxylated polyamine, polyethylene glycol-polyvinylacetate;
   g. said hueing agent is selected from the group consisting of small molecule dyes, polymeric dyes, dye clay conjugates and pigments; and
   h. said oligoamine is selected from the group consisting of polyetheramines, and
   i. mixtures thereof.

17. The composition of claim 1 wherein said antifoam composition's organomodified silicone comprises 27 to 33 mole percent 2-phenylpropylmethyl moieties.

18. A composition of claim 1 wherein each $R^2$ moiety of said organomodified silicone is independently selected from the group consisting of H, an aromatic hydrocarbon radical covalently attached to silicon via aliphatic groups, a monovalent, optionally substituted, aromatic hydrocarbon radical which is attached to the silicon atom via a carbon ring atom; a monovalent, SiC-bonded, optionally substituted, aliphatic hydrocarbon radical that optionally comprises a heteroatom; a monovalent, Si—X—C-bonded, optionally substituted, aliphatic hydrocarbon radical wherein X is a heteroatom, preferably X is sulfur, nitrogen or phosphorus; —SH; and —NH$_2$.

19. A composition of claim 1, said composition comprising, based on the total weight of the composition, from about 0.01% to about 5.0% of said anti-foam.

20. A method of treating and/or cleaning a situs, said method comprising
   a) optionally washing, rinsing and/or drying said situs;
   b) contacting said situs with a antifoam composition and/or a consumer product according to any one of claims 1-19; and
   c) optionally washing, rinsing, and/or drying said situs.

* * * * *